United States Patent
Huang et al.

(10) Patent No.: US 9,894,679 B2
(45) Date of Patent: Feb. 13, 2018

(54) DYNAMIC ADJUSTMENT OF DOWNLINK AND UPLINK TRAFFIC SCHEDULING

(71) Applicant: QUALCOMM Incorporated, San Diego, CA (US)

(72) Inventors: Xiaolong Huang, San Jose, CA (US); Chao Zou, Milpitas, CA (US); Srinivas Katar, Fremont, CA (US); Hao Zhu, Milpitas, CA (US); James Simon Cho, Mountain View, CA (US); Alireza Raissinia, Monte Sereno, CA (US)

(73) Assignee: QUALCOMM Incorporated, San Diego, CA (US)

( * ) Notice: Subject to any disclaimer, the term of this patent is extended or adjusted under 35 U.S.C. 154(b) by 130 days.

(21) Appl. No.: 15/074,552

(22) Filed: Mar. 18, 2016

(65) Prior Publication Data

US 2017/0273100 A1    Sep. 21, 2017

(51) Int. Cl.
*H04W 72/12* (2009.01)
*H04W 74/08* (2009.01)

(52) U.S. Cl.
CPC ... *H04W 72/1263* (2013.01); *H04W 72/1252* (2013.01); *H04W 74/08* (2013.01); *H04W 74/0808* (2013.01)

(58) Field of Classification Search
None
See application file for complete search history.

(56) References Cited

U.S. PATENT DOCUMENTS

| 8,634,840 B2 * | 1/2014 | Lindskog .......... H04W 72/1242 370/348 |
| 8,937,891 B2 | 1/2015 | Zhang et al. |
| 2012/0002578 A1 | 1/2012 | Ji et al. |

(Continued)

FOREIGN PATENT DOCUMENTS

| EP | 1278388 A2 | 1/2003 |
| WO | WO-2013112983 A2 | 8/2013 |

OTHER PUBLICATIONS

ISA/EP, International Search Report and Written Opinion of the International Searching Authority, Int'l Application No. PCT/US2017/018421, dated Aug. 18, 2017, European Patent Office, Rijswijk, NL, 16 pgs.

(Continued)

*Primary Examiner* — Hassan Kizou
*Assistant Examiner* — Ashil Farahmand
(74) *Attorney, Agent, or Firm* — Holland & Hart LLP

(57) ABSTRACT

Methods, systems, and devices for wireless communication are described. An access point (AP) may win access to an unlicensed frequency channel for a transmission opportunity. For the transmission opportunity, the AP may dynamically schedule a duration of time to be used for uplink transmissions and a duration of time to be used for downlink transmissions. The schedule may be based on a comparison of values for a parameter monitored by the AP. The parameter may be monitored for uplink traffic and for downlink traffic. The parameter may indicate the latency experienced by each direction of traffic, or an intolerance of each (Continued)

direction of traffic to delay. The AP may schedule the uplink and downlink durations to compensate for the discrepancy in latency between the two directions of traffic.

30 Claims, 13 Drawing Sheets

(56) References Cited

U.S. PATENT DOCUMENTS

| | | | | |
|---|---|---|---|---|
| 2012/0044852 | A1* | 2/2012 | Zhang | H04B 7/15528 370/312 |
| 2013/0188516 | A1* | 7/2013 | He | H04W 28/16 370/254 |
| 2013/0194980 | A1 | 8/2013 | Yin et al. | |
| 2015/0036563 | A1* | 2/2015 | Hurd | H04W 72/14 370/281 |
| 2015/0188690 | A1 | 7/2015 | Khoryaev et al. | |
| 2016/0302218 | A1* | 10/2016 | Behravan | H04W 72/0446 |

OTHER PUBLICATIONS

Lenovo, "Frame Structure for LAA SCells Supporting both DL and UL Transmissions," 3GPP TSG RAN WG1 Meeting #82bis, R1-155818, Malmo, Sweden, Oct. 5-9, 2015, 4 pgs., XP051002621, 3rd Generation Partnership Project.

ZTE, "Initial Thoughts on LAA DL+UL Data Transmission," 3GPP TSG-RAN WG2 Meeting #93, R2-161358, St. Julian's, Malta, Feb. 15-19, 2016, 4 pgs., XP051055258, 3rd Generation Partnership Project.

* cited by examiner

DYNAMIC ADJUSTMENT OF DOWNLINK AND UPLINK TRAFFIC SCHEDULING

BACKGROUND

The present disclosure relates to wireless communication, and more specifically to dynamic adjustment of downlink and uplink traffic scheduling.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN) (e.g., IEEE 802.11), may include an access point (AP) that may communicate with one or more stations (STAs) or mobile devices. The AP may be coupled to a network, such as the Internet, and may enable a mobile device to communicate via the network (or communicate with other devices coupled to the AP). A wireless device may communicate with a network device bi-directionally. For example, in a WLAN, a STA may communicate with an associated AP via downlink (DL) and uplink (UL). The DL (or forward link) may refer to the communication link from the AP to the STA, and the UL (or reverse link) may refer to the communication link from the STA to the AP.

A wireless medium (e.g., one or more frequency channels) of the WLAN may be shared so that access to the medium is contention-based, such that wireless devices in the WLAN (e.g., APs, STAs, etc.) may compete for use of the wireless medium. For a contention-based medium, a wireless device that wins access to a channel may transmit over that channel during a transmission opportunity. In some cases, an AP that wins contention for a channel may schedule other wireless devices for communication over that channel during the transmission opportunity won by the AP. Other wireless devices that wish to transmit, but which are not scheduled by the AP, may wait until a subsequent opportunity to contend for the medium. The AP may schedule, during the transmission opportunity, a duration for the communication of downlink traffic and a duration for the communication of uplink traffic. The ratio of the downlink duration to the uplink duration may be fixed or static, but using the same downlink to uplink ratio may result in traffic delays and reduced system efficiency. For example, there may be more downlink traffic than uplink traffic, but the duration available for downlink traffic and the duration available for uplink traffic may not reflect that relationship (e.g., the downlink and uplink durations may be inappropriately proportioned for the imbalance in downlink and uplink traffic). For instance, an excessive amount of time may be reserved for uplink traffic and an inadequate amount of time may be reserved for downlink traffic. In such a scenario, downlink traffic may be delayed even though uplink traffic can be satisfied. In another example, uplink acknowledgments for downlink traffic may be delayed due to inadequate available resources (e.g., due to an inadequate duration available for uplink transmissions). For example, an AP may refrain from transmitting downlink traffic, even though there are adequate frequency resources, until the delayed acknowledgements have been received. Delay for the acknowledgments may result in delay for downlink traffic and reduce efficiency.

SUMMARY

An access point (AP) may use an unlicensed (or shared) radio frequency (RF) spectrum band to communicate with other wireless devices (e.g., stations (STAs)). The AP may win a contention for access to the unlicensed RF band (e.g., for one or more channels in the unlicensed RF band) over other wireless devices, APs, or STAs. For example, the AP may earn the exclusive right to access the medium for a period of time referred to herein as a transmission opportunity. During the transmission opportunity, the AP may schedule other wireless devices for uplink and/or downlink transmissions of uplink and/or downlink traffic. For example, the AP may reserve, or schedule, a duration of time that is allocated for downlink traffic transmissions. The AP may also reserve, or schedule, a duration of time that is allocated for uplink traffic transmissions. The AP may determine the length of each duration based on the respective traffic experiences for the uplink and downlink. For instance, the AP may select (e.g., adjust) the length of the uplink and downlink durations based on a latency associated with downlink traffic and a latency associated with uplink traffic. The adjustment may occur dynamically, for example per transmission opportunity based on current or the most recent traffic experiences as determined by monitored parameters associated with downlink and uplink traffic. For example, if uplink traffic is experiencing greater delay than downlink traffic, the AP may schedule a longer uplink duration (e.g., respective to a previous uplink duration) and a shorter downlink duration (respective to the previous downlink duration).

The AP may determine the latency associated with each direction of traffic by monitoring a parameter that is indicative of delay. For example, the AP may monitor the packet length used for uplink and downlink traffic. Longer packet lengths may indicate greater delay and shorter packet lengths may indicate less delay. In some cases, the AP may monitor the delay for each direction of traffic. The AP may, in some examples, monitor the queue size for each direction of traffic. Longer queue sizes may indicate greater delay and shorter queue sizes may indicate less delay. The AP may also monitor the number of users assigned high or highest priority or ranking (e.g., users that are delay sensitive or delay-intolerant). The AP may compare the respective parameters for the uplink and downlink to determine which traffic direction is experiencing greater delay (or is less tolerant of experiencing delay). In some examples, the AP may monitor the above-described parameters at the AP by receiving information concerning the parameters for a downlink device (e.g., a STA). The AP may adjust the durations available for uplink traffic and downlink traffic relative to each other for a subsequent transmission opportunity to address the identified discrepancies in latency.

An apparatus is described. The apparatus may include a memory that stores instructions and a processor coupled with the memory. The processor and the memory may be configured to monitor a parameter for downlink (DL) traffic and a parameter for uplink (UL) traffic, determine that a contention for access to an unlicensed radio frequency (RF) spectrum band for a transmission opportunity has succeeded, and adjust scheduling for a DL communications duration and an UL communications duration for the transmission opportunity based at least in part on a comparison of a first value associated with the monitored parameter for DL traffic and a second value associated with the monitored parameter for UL traffic.

A method of wireless communication is described. The method may include monitoring a parameter for DL traffic and a parameter for UL traffic, determining that a contention for access to an unlicensed RF spectrum band for a transmission opportunity has succeeded, and adjusting scheduling for a DL communications duration and an UL communications duration for the transmission opportunity based at least in part on a comparison of a first value associated with the monitored parameter for DL traffic and a second value associated with the monitored parameter for UL traffic.

A further apparatus for wireless communication is described. The apparatus may include means for monitoring a parameter for DL traffic and a parameter for UL traffic, means for determining that a contention for access to an unlicensed RF spectrum band for a transmission opportunity has succeeded, and means for adjusting scheduling for a DL communications duration and an UL communications duration for the transmission opportunity based at least in part on a comparison of a first value associated with the monitored parameter for DL traffic and a second value associated with the monitored parameter for UL traffic.

A non-transitory computer readable medium for wireless communication is described. The non-transitory computer-readable medium may include instructions to cause a processor to monitor a parameter for DL traffic and a parameter for UL traffic, determine that a contention for access to an unlicensed RF spectrum band for a transmission opportunity has succeeded, and adjust scheduling for a DL communications duration and an UL communications duration for the transmission opportunity based on a comparison of a first value associated with the monitored parameter for DL traffic and a second value associated with the monitored parameter for UL traffic.

Some examples of the method, apparatus, or non-transitory computer-readable medium described above may further include processes, features, means, or instructions for determining a transport protocol for the DL traffic and the UL traffic. Some examples of the method, apparatus, or non-transitory computer-readable medium described above may further include processes, features, means, or instructions for selecting the parameter for the DL and the parameter for the UL to monitor based on the determined transport protocol. In some examples of the method, apparatus, or non-transitory computer-readable medium described above, the transport protocol comprises a user datagram protocol (UDP) or a transmission control protocol (TCP).

In some examples of the method, apparatus, or non-transitory computer-readable medium described above, the parameter for DL traffic comprises a DL physical layer convergence protocol (PLCP) protocol data unit (PDU) (PPDU) length and the parameter for UL traffic comprises an UL PPDU length. In some examples of the method, apparatus, or non-transitory computer-readable medium described above, adjusting the scheduling comprises determining whether the first value satisfies a predetermined DL PPDU length threshold, and whether the second value satisfies a predetermined UL PPDU length threshold, and scheduling the DL communications duration and the UL communications duration for the transmission opportunity based on the determinations of threshold satisfaction.

In some examples of the method, apparatus, or non-transitory computer-readable medium described above, the parameter for DL traffic is at least one of a DL delay, or a DL queue size, or a combination thereof, and the parameter for UL traffic is at least one of an UL delay, or an UL queue size, or a combination thereof. In some examples of the method, apparatus, or non-transitory computer-readable medium described above, adjusting the scheduling further comprises determining that the first value is greater than the second value, and suspending UL communications based on the determination that the first value is greater than the second value. In some examples of the method, apparatus, or non-transitory computer-readable medium described above, adjusting the scheduling further comprises determining that the second value is greater than the first value, and suspending DL communications based on the determination that the second value is greater than the first value.

In some examples of the method, apparatus, or non-transitory computer-readable medium described above, the first and second values are at least one of an average value, or a maximum value, or a combination thereof. In some examples of the method, apparatus, or non-transitory computer-readable medium described above, the parameter for DL traffic comprises a first number of users assigned a highest quality of service (QoS) access category (AC) associated with the DL traffic, and the parameter for UL traffic comprises a second number of users assigned a highest QoS AC associated with the UL traffic.

In some examples of the method, apparatus, or non-transitory computer-readable medium described above, the monitoring comprises monitoring a DL queue and an UL queue, and the scheduling adjustment is based on a size of the DL queue and a size of the UL queue. In some examples of the method, apparatus, or non-transitory computer-readable medium described above, the DL queue comprises at least one of DL data, or DL acknowledgements (ACKs) for UL data, or a combination thereof. In some examples of the method, apparatus, or non-transitory computer-readable medium described above, the UL queue comprises at least one of UL data, or UL ACKs for DL data, or a combination thereof.

Some examples of the method, apparatus, or non-transitory computer-readable medium described above may further include processes, features, means, or instructions for determining a departure rate for the UL traffic and a departure rate for the DL traffic, where the scheduling adjustment is further based on the determined departure rates. In some examples of the method, apparatus, or non-transitory computer-readable medium described above, the monitoring comprises monitoring a DL data queue, a DL ACK queue, an UL data queue, and an UL ACK queue. In some examples of the method, apparatus, or non-transitory computer-readable medium described above, the scheduling adjustment is further based on a size of the DL data queue, a size of the DL acknowledgment queue, a size of the UL data queue, and a size of the UL acknowledgment queue.

Some examples of the method, apparatus, or non-transitory computer-readable medium described above may further include processes, features, means, or instructions for determining a delivery rate for the UL traffic and a delivery rate for the DL traffic, where the scheduling adjustment is based on the determined delivery rates. In some examples of the method, apparatus, or non-transitory computer-readable medium described above, adjusting the scheduling further comprises prioritizing an acknowledgment queue over a data queue. In some examples of the method, apparatus, or non-transitory computer-readable medium described above, monitoring the parameter for UL traffic comprises receiving, from a station, information associated with the parameter for UL traffic.

DETAILED DESCRIPTION

Figure 1:
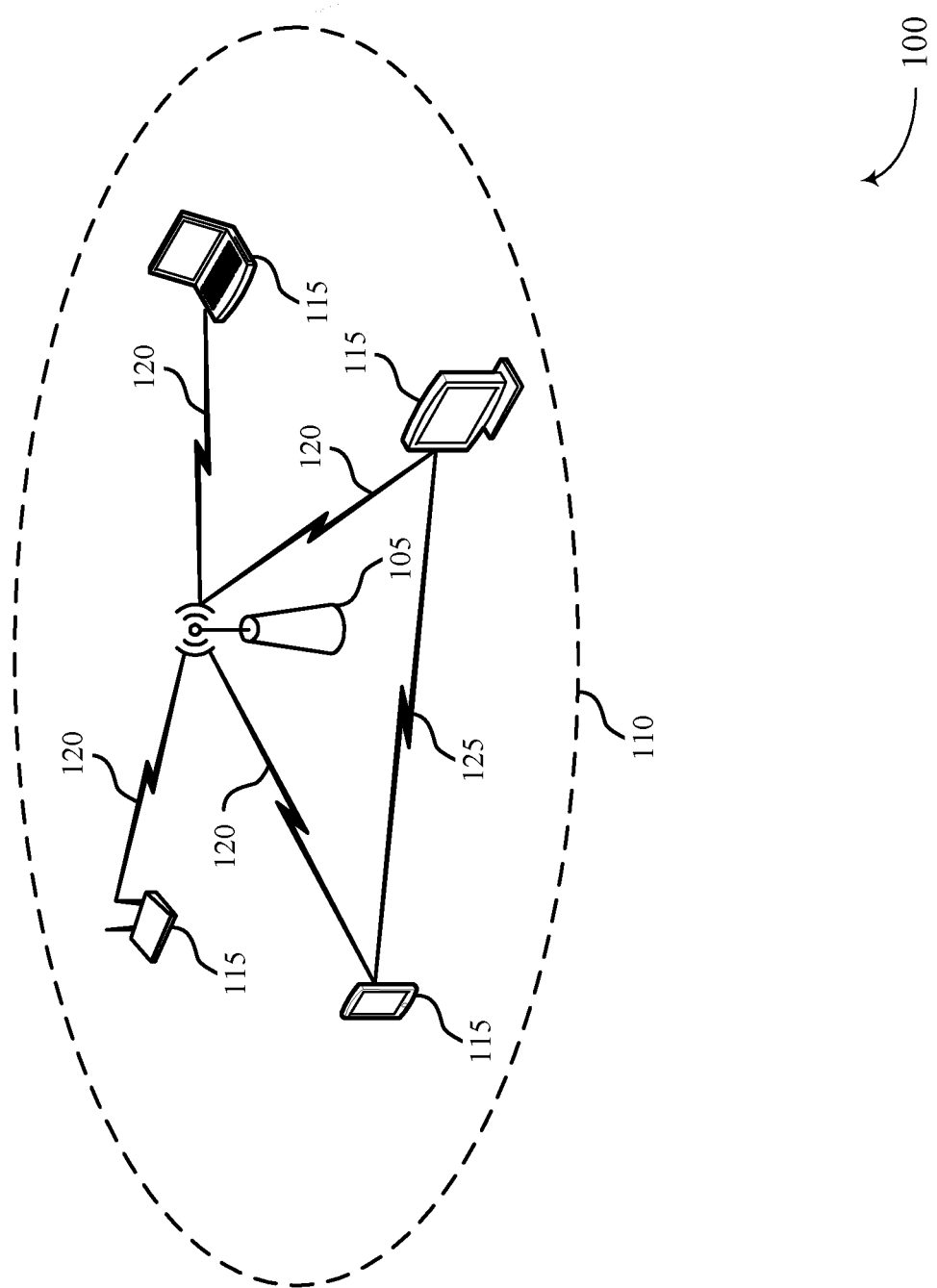
FIG. 1 illustrates a wireless communications system configured in accordance with aspects of the present disclosure.

An access point (AP) may reduce communications latency by dynamically adjusting the amount of time allocated for downlink traffic and uplink traffic during a transmission opportunity. The amount of time allocated for the downlink traffic and uplink traffic may be based on a comparison of downlink and uplink parameters that are indicative of delay.

In a wireless location area network (WLAN) such as Wi-Fi (e.g., 802.11ax), an AP may contend with other wireless devices for access to an unlicensed channel. The unlicensed channel may be a portion of spectrum that includes frequency bands traditionally used by Wi-Fi technology, such as the 5 GHz band, the 2.4 GHz band, the 60 GHz band, the 3.6 GHz band, and/or the 900 MHz band. The unlicensed spectrum may also include other frequency bands. The wireless device that wins the contention may control the channel for a duration of time referred to as a transmission opportunity. When an AP wins a transmission opportunity, the AP may schedule other wireless devices for uplink transmissions during the transmission opportunity. The AP may also transmit downlink traffic to wireless devices during the transmission opportunity. The AP may determine how much time of the transmission opportunity is allocated to downlink transmissions and how much time is allocated to uplink transmissions. For example, the AP may select a downlink duration of time in which downlink traffic is communicated and an uplink duration of time in which uplink traffic is communicated. To schedule downlink and uplink durations for a transmission opportunity, the AP may determine the experience of downlink and uplink traffic. If the AP detects that one direction of traffic is experiencing greater delay than the other direction, the AP may adjust the downlink and uplink durations to correct the discrepancy and reduce the delay.

An AP may monitor a parameter indicative of delay for uplink traffic and downlink traffic. The AP may compare the respective uplink and downlink values of the parameter to determine which direction of traffic is experiencing more delay, or which direction of traffic is less tolerant of delay. Based on this determination, the AP may adjust the uplink and downlink durations. In some cases, the AP may select the parameter based on the type of transport layer protocol used for the uplink and downlink. For example, different parameters may be monitored for transmission control protocol (TCP), which uses acknowledgments, than for user datagram protocol (UDP), which does not use acknowledgments. The parameter selected for TCP traffic may compensate for the use of acknowledgments. Examples of parameters the AP 105 may monitor include latency, queue size (e.g., data queue length and/or acknowledgment queue length), user and/or traffic ranking, and packet length.

Features of the disclosure introduced above are further described below in the context of a wireless communications system. Specific examples are then described for dynamic adjustment of downlink and uplink traffic scheduling. These and other features of the disclosure are further illustrated by and described with reference to apparatus diagrams, system diagrams, and flowcharts that relate to the adjustment of downlink and uplink scheduling for transmission opportunities.

FIG. 1 illustrates a wireless communications system 100 configured in accordance with aspects of the present disclosure. The wireless communications system 100 may be an example of a wireless local area network (WLAN) (also known as a Wi-Fi network, such as 802.11ax) and may include an access point (AP) 105 and multiple associated stations (STAs) 115. The STAs 115 may represent devices such as mobile stations, personal digital assistant (PDA), other handheld devices, netbooks, notebook computers, tablet computers, laptops, display devices (e.g., TVs, computer monitors, etc.), printers, etc. The AP 105 and the associated STAs 115 may represent a basic service set (BSS) or an extended service set (ESS). The various STAs 115 in the network are able to communicate with one another through the AP 105. Also shown is a coverage area 110 of the AP 105, which may represent a basic service area (BSA) of the wireless communications system 100. An extended network station associated with the wireless communications system 100 may be connected to a wired or wireless distribution system that may allow multiple APs 105 to be connected in an ESS. An AP 105 or STA 115 may reserve a wireless medium (e.g., a frequency channel) for communication during a period of time by contending with other wireless devices for access of the medium. When the AP 105 wins contention, the AP 105 may schedule uplink and downlink communications during the period of time. The AP 105 may adjust the uplink and downlink durations based on the latency associated with uplink and downlink traffic.

In some cases, a STA 115 may be located in the intersection of more than one coverage area 110 and may associate with more than one AP 105. A single AP 105 and an associated set of STAs 115 may be referred to as a BSS. An ESS is a set of connected BSSs. A distribution system may be used to connect APs 105 in an ESS. In some cases, the coverage area 110 of an AP 105 may be divided into sectors. The wireless communications system 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 125 may include Wi-Fi Direct connections, Wi-Fi Tunneled Direct Link Setup (TDLS) links, and other group connections. STAs 115 and APs 105 may communicate according to the WLAN radio and baseband protocol for physical (PHY) and medium access control (MAC) layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within wireless communications system 100.

In some cases, a STA 115 or AP 105 may operate in a shared or unlicensed frequency spectrum. These devices may perform a clear channel assessment (CCA) prior to communicating in order to determine whether the channel is available. A CCA may include an energy detection procedure to determine whether there are any other active transmissions. For example, the device may infer that a change in a received signal strength indication (RSSI) of a power meter indicates that a channel is occupied. Specifically, signal power that is concentrated in a certain bandwidth and exceeds a predetermined noise floor may indicate another wireless transmitter. A CCA may also include detection of specific sequences that indicate use of the channel. For example, another device may transmit a specific preamble prior to transmitting a data sequence.

In some cases, a STA 115 or AP 105 may reserve a channel (e.g., an unlicensed radio frequency (RF) spectrum band) for communications (e.g., via a network allocation vector (NAV) or via enhanced distributed channel access (EDCA)) during a particular period of time. A period of time reserved by an AP 105 may be referred to herein as a transmission opportunity. According to the techniques described herein, an AP 105 may schedule other wireless devices to use the reserved channel during the transmission opportunity. For example, the AP 105 may schedule one or more STAs 115 for uplink transmissions and one or more STAs 115 for downlink transmissions. A number of communication techniques may be used for the uplink and downlink transmissions. In some cases, uplink and/or downlink multi-user multiple-input multiple-output (MU-MIMO) may be used. Additionally or alternatively, downlink and/or uplink orthogonal frequency division multiple access (OFDMA) may be used. In some cases, simultaneous transmit and receive (STR) (also referred to as full duplex) techniques may be implemented, and/or dynamic CCA.

AP 105 may support different types of transport layer protocols. For example, AP 105 may support transmission control protocol (TCP) and user datagram protocol (UDP). Traffic sent using UDP may be delivered using best-effort practices without acknowledgements (ACKs). Thus, in UDP there are no retransmissions for traffic that is unsuccessfully delivered to a receiving device. TCP allows for retransmissions of traffic. In TCP, a receiving device that successfully receives packets from a transmitting device may indicate the successful reception by sending an ACK to the transmitting device. If the transmitting device receives a negative acknowledgment (NACK), or does not receive an ACK within a threshold amount of time after transmission of the packets, the transmitting device may retransmit the packets. Thus, a delay in ACKs may cause unnecessary retransmissions, which may reduce system efficiency and consume resources. In some cases, the transmitting device may refrain from sending new data until it receives an ACK for previously transmitted traffic. Thus, delays in acknowledgement packets may disrupt traffic flow by causing unnecessary traffic delays in the opposite direction. An AP 105 may, according to the techniques described herein, adjust uplink and downlink scheduling to mitigate latency for ACK data.

The AP 105 may schedule (e.g., via a preamble or beacon signal) the uplink and downlink transmissions during respective uplink and downlink durations of time within the transmission opportunity. An uplink duration of time may be reserved for uplink traffic and a downlink duration of time may be reserved for downlink traffic. An AP 105 may adjust the amount of time allocated to uplink traffic and downlink traffic by adjusting the uplink duration and the downlink duration. The AP 105 may make the adjustment based on a detection of delay associated with the uplink and/or downlink. The delay may be detected by monitoring various aspects or parameters of the uplink and downlink. For example, the AP 105 may monitor a traffic queue size for each direction of traffic and, based on the accumulation of packets in the queue, determine that the corresponding direction of traffic is underserved.

Figure 2:
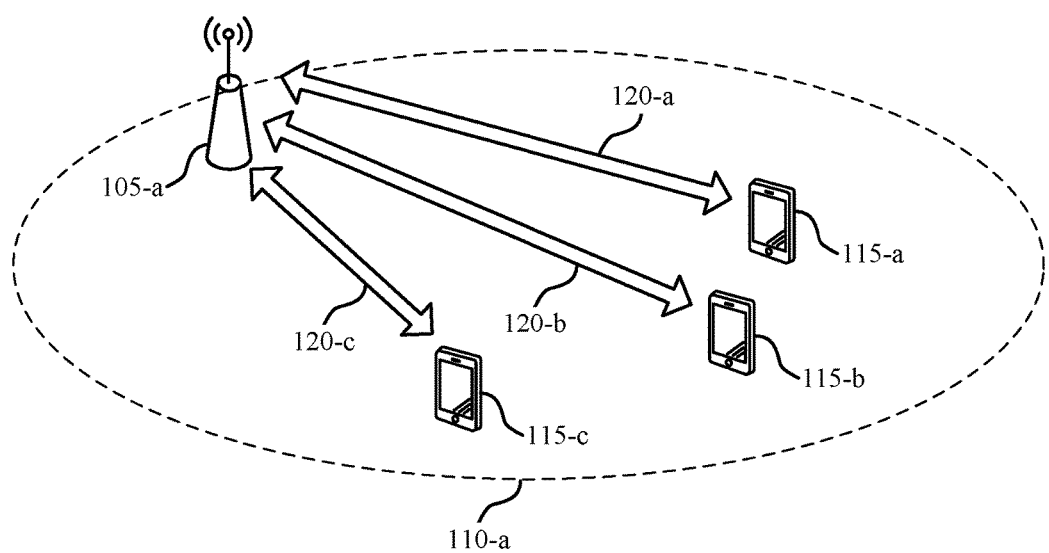
FIG. 2 illustrates an example of a wireless communications subsystem that supports dynamic adjustment of downlink and uplink traffic scheduling in accordance with aspects of the present disclosure.

FIG. 2 illustrates an example of a wireless communications subsystem 200 that supports dynamic adjustment of downlink and uplink traffic scheduling in accordance with aspects of the present disclosure. Wireless communications subsystem 200 may include AP 105-*a*, STA 115-*a*, STA 115-*b*, and STA 115-*c*. AP 105 and STAs 115-*a* through 115-*c* may be examples of an AP 105 and STA 115 described with reference to FIG. 1. AP 105-*a* may communicate with STAs 115 within coverage area 110-*a*.

AP 105-*a* may contend for, and win, access to an unlicensed channel (e.g., an unlicensed RF spectrum band) for a transmission opportunity. AP 105-*a* may determine that STA 115-*a* and STA 115-*b* each have uplink traffic for AP 105-*a*. AP 105-*a* may also determine that AP 105-*a* has downlink traffic for STA 115-*a*, STA 115-*b*, and STA 115-*c*. AP 105-*a* may schedule a duration of the transmission opportunity for downlink traffic and a duration of the transmission opportunity for uplink traffic. The respective durations may be selected based on the latency associated with uplink traffic and downlink traffic. AP 105-*a* may transmit downlink traffic to STA 115-*c* via communication link 120-*c*. The downlink traffic may be transmitted during the downlink duration of the transmission opportunity. Also during the downlink duration, AP 105-*a* may transmit downlink traffic to STA 115-*a* via communication link 120-*a* and downlink traffic to STA 115-*b* via communication link 120-*b*. During the uplink duration of the transmission opportunity, AP 105-*a* may receive, according to scheduling determined by AP 105-*a*, uplink traffic from STA 115-*a* via communication link 120-*a* and uplink traffic from STA 115-*b* via communication link 120-*b*. The uplink and downlink traffic may be communicated using single-user MIMO (SU-MIMO), MU-MIMO, OFDMA, and/or STR. As described herein, AP 105-*a* may dynamically select and schedule the uplink and downlink durations based on uplink and downlink parameters associated with or indicative of latency.

Figure 3:
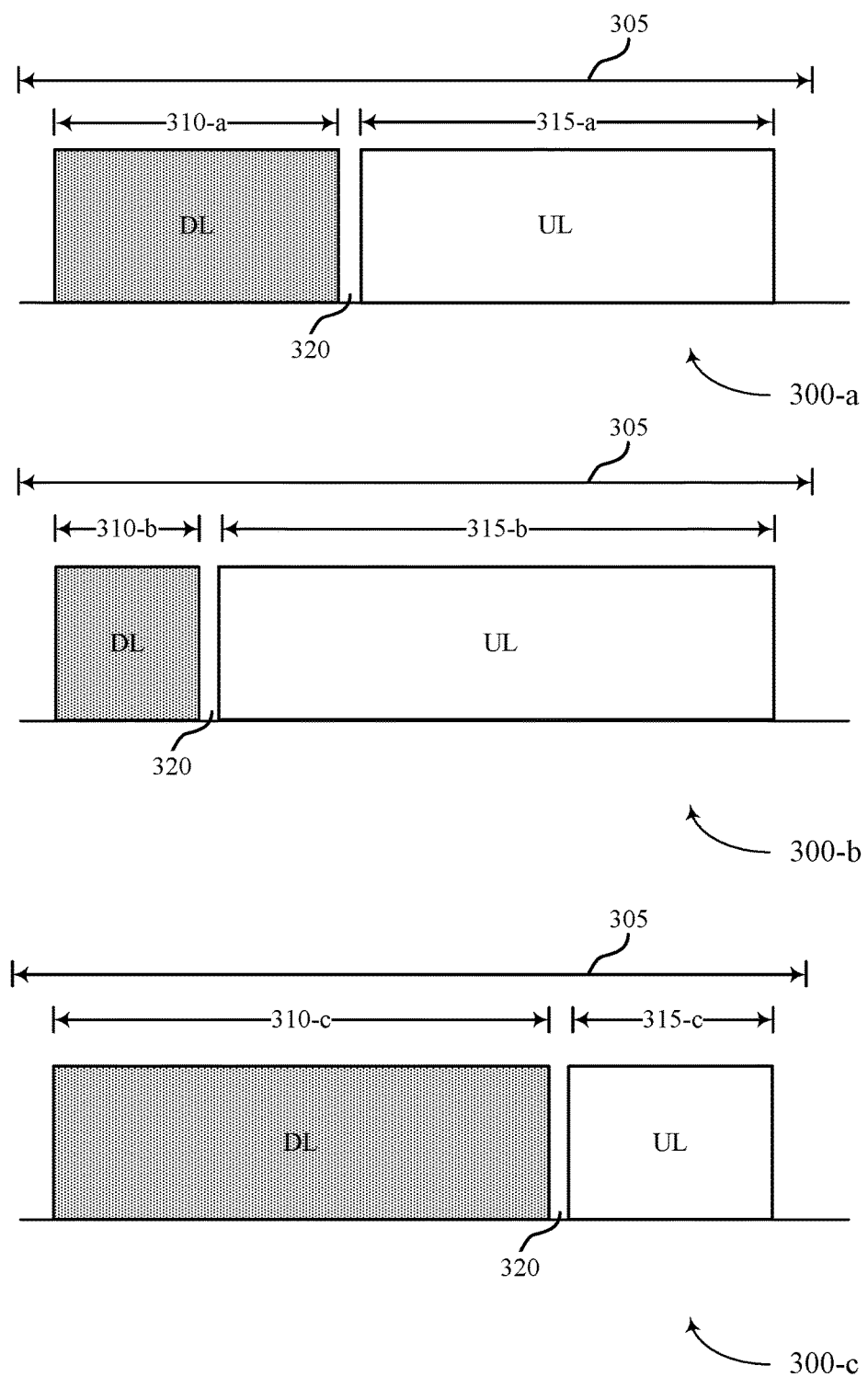
FIG. 3 illustrates examples of downlink and uplink scheduling for transmission opportunities that support dynamic adjustment of downlink and uplink traffic scheduling in accordance with aspects of the present disclosure.

FIG. 3 illustrates examples of downlink and uplink scheduling for transmission opportunities 300 that support dynamic adjustment of downlink and uplink traffic scheduling in accordance with aspects of the present disclosure. Transmission opportunities 300 may be transmission opportunities that have been successfully contended for by an AP 105. Each transmission opportunity 300 may have a duration 305. Although shown with a same duration 305, one or more of the transmission opportunities 300 may have a different duration. Each transmission opportunity 300 may include a downlink duration 310 and an uplink duration 315. Thus, a downlink duration 310 and an uplink duration 315 for a transmission opportunity 300 may be bounded by the duration 305 of the transmission opportunity 300. Downlink transmissions may occur during a downlink duration 310 and uplink transmissions may occur during an uplink duration 315. Each transmission opportunity 300 may also include one or more interframe spaces (e.g., SIFS, etc.), depicted in FIG. 3 as aggregate interframe space duration 320. Although interframe spaces may be dispersed temporally throughout a transmission opportunity 300, the aggregate duration of time of all the interframe spaces included in a transmission opportunity 300 is represented by a single contiguous chunk of time for ease of understanding. Downlink durations 310 and uplink durations 315 may be contiguous or separated in time (e.g., by various interframe spaces). Each transmission opportunity 300 may be preceded by control information (e.g., conveyed by a beacon) that indicates uplink and downlink scheduling to STAs 115. Additionally or alternatively, a transmission opportunity may include control information (e.g., scheduling information, request to send (RTS) messages, clear to send (CTS) messages, etc.).

The durations and/or percentage of duration 305 allocated for downlink traffic and uplink traffic may be dynamically modified for each transmission opportunity 300. For example, an AP 105 may schedule downlink duration 310-$a$ and uplink duration 315-$a$ for transmission opportunity 300-$a$, downlink duration 310-$b$ and uplink duration 315-$b$ for transmission opportunity 300-$b$, and downlink duration 310-$c$ and uplink duration 315-$c$ for transmission opportunity 300-$c$. The ratio of time allocated to downlink transmission and uplink transmissions (e.g., downlink duration 310 to uplink duration 315) may be referred to herein as the DL/UL split. If an AP 105 desires to reduce the amount of time dedicated to downlink traffic and increase the amount of time dedicated to uplink traffic, the AP 105 may reduce the DL/UL split. For example, the AP 105 may reduce the downlink duration 310 and increase the uplink duration 315 relative to a preceding (e.g., immediately preceding) transmission opportunity 300, such as shown by transmission opportunity 300-$a$ and transmission opportunity 300-$b$. If the AP 105 desires to increase the amount of time dedicated to downlink traffic and reduce the amount of time dedicated to uplink traffic, the AP 105 may increase the DL/UL split. For example, the AP 105 may increase the downlink duration 310 and decrease the uplink duration 315 relative to a preceding (e.g., immediately preceding) transmission opportunity 300, such as shown by transmission opportunity 300-$b$ and transmission opportunity 300-$c$.

The modification to downlink duration 310 and uplink duration 315 (e.g., the modification to the DL/UL split) may be based on the experience (e.g., delay) of uplink traffic and downlink traffic. For example, a particular DL/UL split may result in downlink traffic experiencing significantly different latency than uplink traffic. For TCP ACKs, such delay prevent the TCP congestion window from opening to its maximum value. According to the techniques described herein, an AP 105 may recognize when there is a latency discrepancy between downlink and uplink and adjust the DL/UL split so that the downlink and uplink experience similar latency.

To detect a mismatch in latency for downlink and uplink traffic, an AP 105 may monitor the same parameter for each direction of traffic. The monitored parameter may be different for different types of traffic (e.g., UDP versus TCP). For TCP traffic, the AP 105 may monitor latency, packet length (e.g., physical layer convergence protocol (PLCP) protocol data unit (PPDU) length), queue size, and/or user rankings. For UDP traffic, the AP 105 may monitor downlink queue size, uplink queue size, downlink and uplink departure rates, and downlink and uplink delivery rates. The AP 105 may compute the DL/UL split ratio using values for the monitored parameters.

Figure 4:
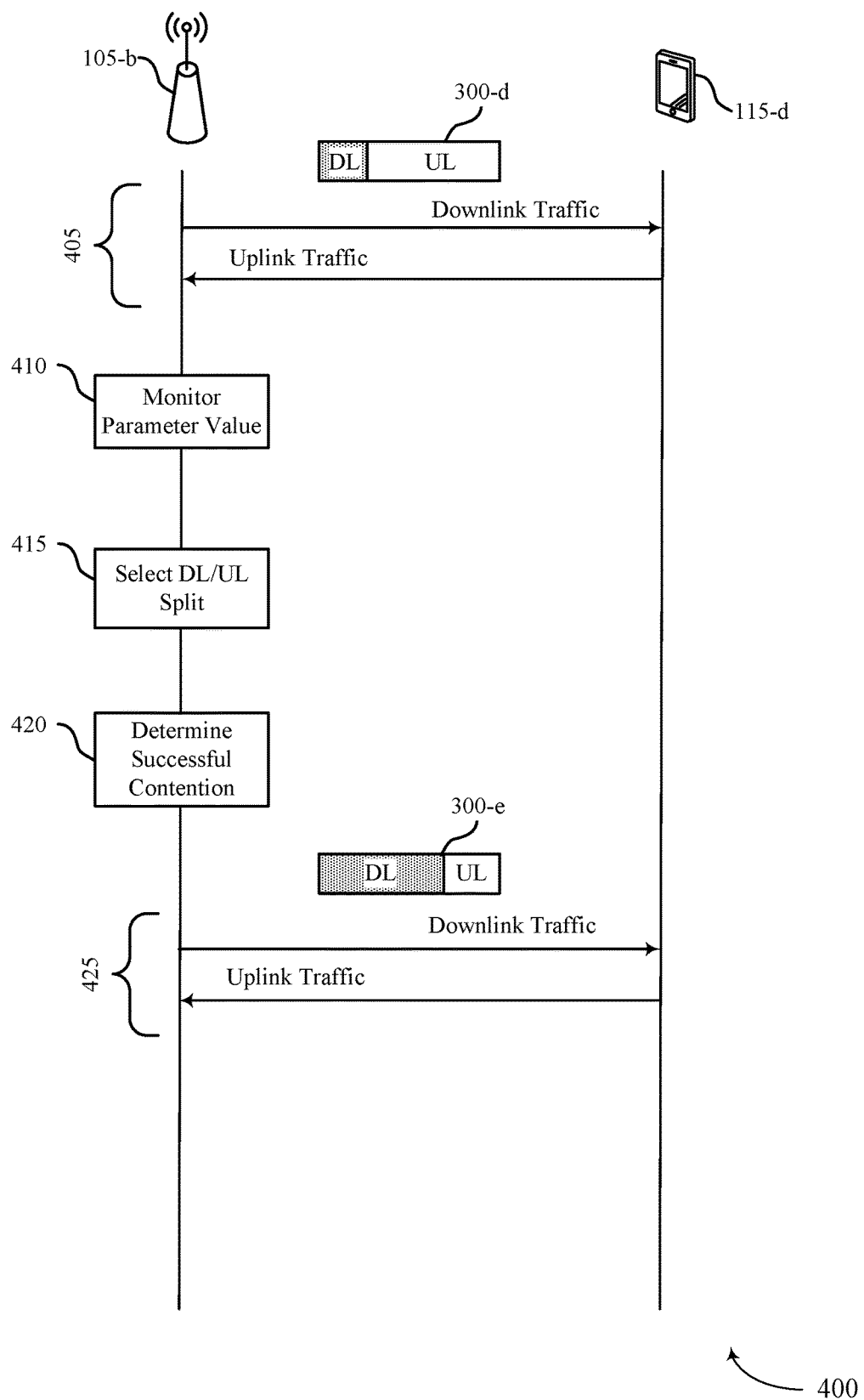
FIG. 4 illustrates an example of a process flow for dynamic adjustment of downlink and uplink traffic scheduling in accordance with aspects of the present disclosure.

FIG. 4 illustrates an example of a process flow 400 for dynamic adjustment of downlink and uplink traffic scheduling in accordance with aspects of the present disclosure. Process flow 400 may represent the actions and communications of AP 105-$b$ and STA 115-$d$. AP 105-$b$ may be an example of an AP 105 described with reference to FIGS. 1 and 2. STA 115-$d$ may be an example of a STA 115 described with reference to FIGS. 1 and 2. AP 105-$b$ may dynamically adjust the DL/UL split for individual transmission opportunities. The communications depicted in process flow 400 may be transmitted over an unlicensed channel, which may contain multiple contiguous or non-contiguous subchannels, for which AP 105-$b$ has successfully contended. Although shown with respect to a single STA 115, the techniques described herein may be implemented for any number of STAs 115.

At 405, AP 105-$b$ and STA 115-$d$ may communicate over the unlicensed channel. For example, AP 105-$b$ may transmit downlink traffic to STA 115-$d$, and STA 115-$d$ may transmit uplink traffic to AP 105-$b$. The transmissions may occur during a transmission opportunity duration, which is represented by transmission opportunity 300-$d$. Thus, the transmissions may occur according to scheduling determined by AP 105-$b$ (e.g., the transmissions may follow the DL/UL split). As depicted in FIG. 4, AP 105-$b$ scheduled a transmission opportunity 300-$d$ with longer duration for uplink transmissions than for downlink transmissions.

At 410, AP 105-$b$ may monitor the same parameter (e.g., PPDU size, queue size, etc.) for downlink traffic and uplink traffic. Although shown subsequent to transmission opportunity 300-$d$, the monitoring may occur before, during, and/or after transmission opportunity 300-$d$. In some cases, monitoring may include receiving information regarding the parameter from STA 115-$d$. At 415, AP 105-$d$ may select a DL/UL split for an upcoming transmission opportunity (e.g., the immediately subsequent transmission opportunity). For example, AP 105-$a$ may schedule a downlink communications duration and an uplink communications duration for the upcoming transmission opportunity. In some cases, the selection of the DL/UL split may involve an adjustment of the downlink and uplink communications durations corresponding to a previous transmission opportunity. For example, the selection may adjust the DL/UL split corresponding to transmission opportunity 300-$d$.

The selection of the DL/UL split may be based on a comparison of the parameters monitored for the downlink and uplink traffic. For example, AP 105-$b$ may determine a value for each of the respective parameters and compare the values to each other, or to one or more corresponding predetermined threshold values. The monitored parameters used by AP 105-$b$ to determine the DL/UL split may be different for UDP traffic and TCP traffic, or may be wholly or partially the same, but used by the AP 105-$b$ differently to determine the DL/UL split. If ACKs for TCP traffic are delayed, data rates in the corresponding direction may be stalled while the transmitter waits for the ACKs. Thus, resources (e.g., time and frequency) allocated for data traffic in the direction corresponding to the ACKs may be underutilized. Accordingly, AP 105-$b$ may monitor ACKs for TCP traffic on the uplink and downlink. In some cases, a wireless device (e.g., an AP 105 or STA 115) may increase the priority of ACKS over certain types of data, for example by putting the ACKs in queues that are reserved for data with high quality of service (QoS) requirements (e.g., high access category (AC) data, such as voice and/or video). Alternatively, the ACKs may be placed in a queue that is reserved only for ACKs. For TCP traffic, the ACKs may be monitored regardless of which queue the ACKs are placed.

The ACKs for uplink and downlink may be monitored and compared to determine the DL/UL split. In some cases, other parameters may be monitored and compared. For example, if downlink data and ACKs are placed in a first queue and uplink data and ACKs are placed in a second queue, the AP 105 may monitor the queue sizes for downlink traffic ($Q_d$) and uplink traffic ($Q_u$), respectively. In some cases, if the data and ACKS are placed in separate queues, the AP 105 may monitor the queue size for uplink data ($N_u$), the queue size for downlink data ($N_d$), the queue size for uplink ACKs ($N_{u\_ack}$), and the queue size for downlink ACKs ($N_{d\_ack}$). The size of a queue may refer to the number of packets in the queue. Thus, the queue size for downlink traffic $Q_d$ may represent the number of data and ACK packets for transmission on the downlink and the queue size for uplink traffic $Q_u$ may represent the number of data and ACK packets for transmission on the uplink. The number of ACK packets per data packet may be referred to herein as the compression ratio γ. For the uplink, the compression ratio may be given by $$\gamma_u = \frac{N_u}{N_{d\_ack}}.$$

For the downlink, the compression ratio may be given by $$\gamma_d = \frac{N_d}{N_{u\_ack}}.$$

An AP 105 may also monitor the respective delivery rates and departures rates for downlink and uplink traffic. The department rate ($R_{depart}$) may refer to the number of packets that are transmitted by a transmitting device in a given period of time. Therefore, the downlink departure rate ($R_{depart\_d}$) refers to the number of packets transmitted by an AP 105 during a given period of time and the uplink departure rate ($R_{depart\_u}$) refers to the number of packets transmitted by a STA 115 during a given period of time. The delivery rate ($R_{deliver}$) may refer to the number of packets that are successfully received by a receiving device for a given period of time. Therefore, the downlink delivery rate ($R_{deliver\_d}$) refers to the number of packets successfully received by a STA 115 during a given period of time and the uplink delivery rate ($R_{deliver\_u}$) refers to the number of packets successfully received by an AP 105 during a given period of time.

In some cases, an AP 105 may use one or more of the monitored parameters to compute the DL/UL split ratio. For example, the AP 105 may select the DL/UL split ratio on the left hand side of equation 1 to match the right hand side of equation 1.

$$\frac{DL}{UL} = \frac{(N_d + N_{d_{ack}})/R_{depart\_d}}{N_u + N_{u\_ack})/R_{depart\_u}} \qquad (1)$$

If the data and ACKs are separated into different queues, equation 1 may be simplified by substituting in $$N_{d\_ack} = \frac{N_u}{\gamma_u}$$

and $$N_{u\_ack} = \frac{N_d}{\gamma_d},$$

as shown in equation 2.

$$\frac{DL}{UL} = \frac{(N_d + N_u/\gamma_u)/R_{depart\_d}}{N_u + N_d/\gamma_d)/R_{depart\_u}} \qquad (2)$$

Thus, the AP 105 may determine the DL/UL split by monitoring the downlink data queue size $N_d$, the uplink data queue size $N_u$, the downlink departure rate $R_{depart\_d}$, and the uplink departure rate $R_{depart\_u}$. The AP 105 refrain from monitoring the queue size for uplink ACKs ($N_{u\_ack}$) and the queue size for downlink ACKs ($N_{d\_ack}$). If the computed DL/UL ratio is a fraction, the AP 105 may round up or down to the nearest integer.

If the data and ACKs are not separated into different queues, equation 1 may be simplified by substituting in $N_d = Q_d - N_u/\gamma_u$ and $N_u = Q_u - N_d/\gamma_d$, as shown in equation 3. These relationships are derived by substituting $$N_{d\_ack} = \frac{N_u}{\gamma_u}$$

into $Q_d = N_d + N_{d\_ack}$, and substituting $$N_{u\_ack} = \frac{N_d}{\gamma_d}$$

into $Q_u = N_u + N_{u\_ack}$.

$$\frac{DL}{UL} = \frac{Q_d/R_{depart\_d}}{Q_u/R_{depart\_u}} \qquad (3)$$

Thus, the AP 105 may determine the DL/UL split (given by $$\frac{DL}{UL})$$

by monitoring the downlink traffic queue size $Q_d$, the uplink traffic queue size $Q_u$, the downlink departure rate $R_{depart\_d}$, and the uplink departure rate $R_{depart\_u}$. The AP 105 refrain from monitoring the queue size for uplink ACKs ($N_{u\_ack}$) and the queue size for downlink ACKs ($N_{d\_ack}$).

In some examples, TCP traffic may be transmitted on the downlink, but not on the uplink. In such examples, UDP traffic may be transmitted on the uplink. If the data and ACKs are separated into different queues and there is not any uplink data traffic (e.g., $N_u=0$ and $N_{d\_ack}=0$), equation 1 becomes equation 4, as shown below.

$$\frac{DL}{UL} = \frac{(N_d)/R_{deliver\_d}}{(N_{u\_ack})/R_{deliver\_u}} \qquad (4)$$

Rearranging and substituting in $$\gamma_d = \frac{N_d}{N_{u\_ack}}$$

gives equation 5.

$$\frac{DL}{UL} = \gamma_d \frac{R_{deliver\_u}}{R_{deliver\_d}} \quad (5)$$

Thus, the DL/UL split may be increased if the uplink delivery rate $R_{deliver\_u}$ is greater than the downlink delivery rate $R_{deliver\_d}$, and the DL/UL split may be decreased if the uplink delivery rate $R_{deliver\_u}$ is less than the downlink delivery rate $R_{deliver\_d}$.

At 420, AP 105-*b* may determine that a contention for the unlicensed channel for a transmission opportunity has been successful. In other examples, the determination that contention is successful at 420 may precede or overlap in time with monitoring parameter values at 410 and/or selecting the DL/UL split at 415.

Once contention is successful at 425, AP 105-*b* and STA 115-*d* may communicate over the unlicensed channel according to scheduling by AP 105-*b*. For example, AP 105-*b* may transmit downlink traffic to STA 115-*d* and STA 115-*d* may transmit uplink traffic to AP 105-*b*. The transmissions may occur during a transmission opportunity duration, which is represented by transmission opportunity 300-*e*. Thus, the transmissions may occur according to the scheduling determined by AP 105-*b* (e.g., the transmissions may follow the selected DL/UL split). As depicted in FIG. 4, AP 105-*b* may schedule a transmission opportunity 300-*e* with a shorter duration for uplink transmissions than for downlink transmissions. Transmission opportunity 300-*e* may therefore represent an adjusted version of transmission opportunity 300-*d*.

Figure 5:
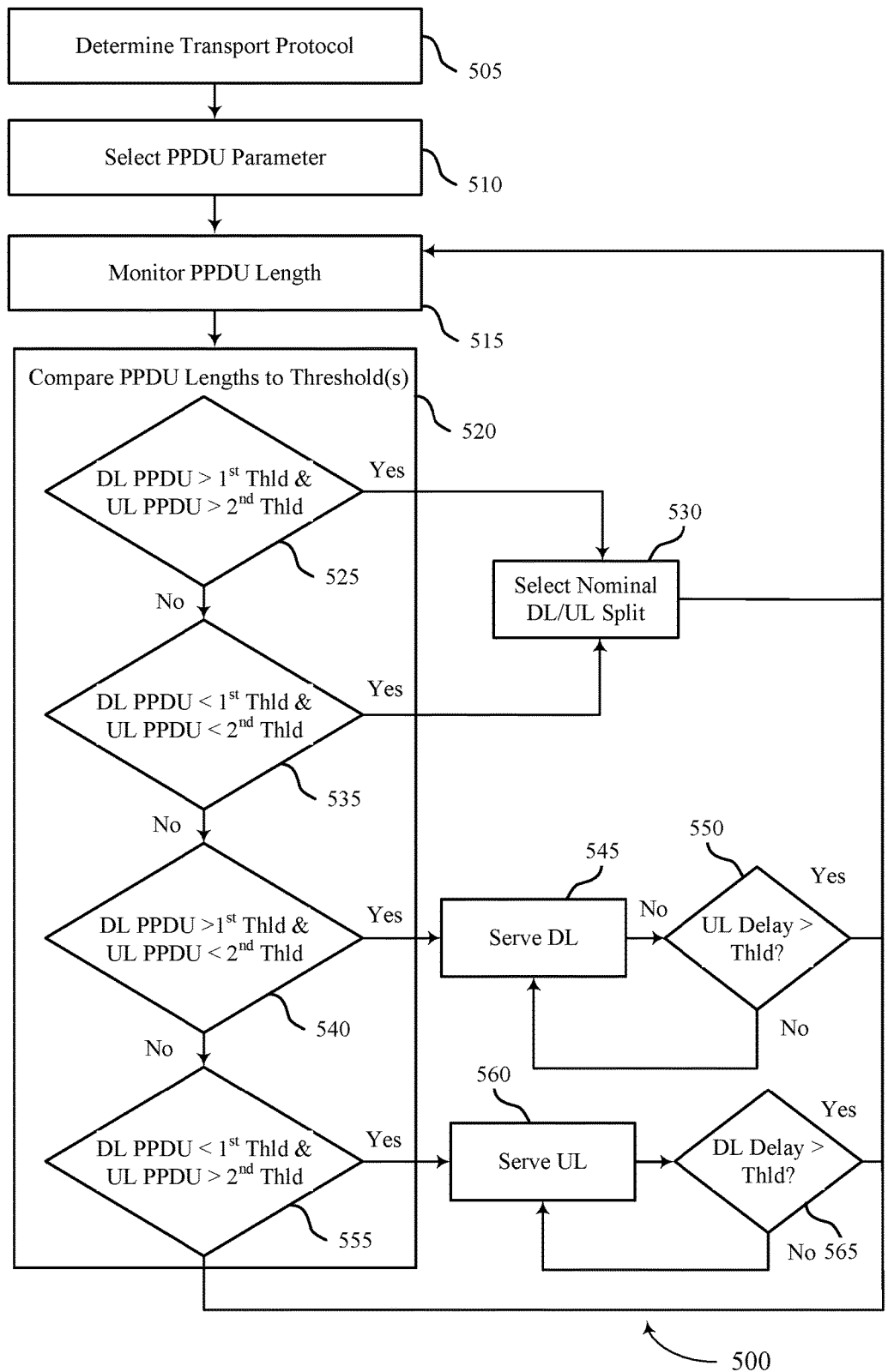
FIG. 5 illustrates an example of a process flow for dynamic adjustment of downlink and uplink traffic scheduling in accordance with aspects of the present disclosure.

FIG. 5 illustrates an example of a process flow 500 for dynamic adjustment of downlink and uplink traffic scheduling in accordance with aspects of the present disclosure. An AP 105 may perform the operations of process flow 500 to dynamically adjust the DL/UL split for individual transmission opportunities over an unlicensed channel.

At 505, the AP 105 may determine the transport layer protocol to be used in subsequent communication. The transport layer protocol may factor into the decision made by the AP 105 on which parameter to monitor. For example, for transport layer protocols that use acknowledgments (e.g., TCP), AP 105 may select a parameter that takes acknowledgments into account. For transport layer protocols that do not use acknowledgements (e.g., UDP), the AP 105 may select different parameters that are indicative of delay. At 510, the AP 105 may select, based on the transport layer protocol, PPDU packet length as a parameter to monitor. In some cases, the parameter may be selected irrespective of the transport layer protocol. At 515, the AP may monitor the selected parameter (PPDU length) for downlink traffic and for uplink traffic. For example, the AP 105 may determine the PPDU length of transmitted packets and the PPDU length of received packets. The length of the downlink PPDU may be referred to as the value of the selected parameter for the downlink and the length of the uplink PPDU may be referred to as the value for the selected parameter for the uplink. Monitoring the parameter may include analyzing or evaluating downlink and uplink traffic, and/or receiving information indicative of the parameter from a STA 115.

At 520, the AP 105 may compare the respective downlink and uplink values of the parameter to one or more corresponding predetermined threshold (Thld) values. For example the AP 105 may compare the downlink PPDU length to a first threshold value and compare the uplink PPDU length to a second threshold value. The first threshold and the second threshold may be the same or different values. At 525, the AP 105 may determine whether the downlink PPDU length is greater than a first threshold and if the uplink PPDU length is greater than a second threshold. If the downlink PPDU length is greater than the first threshold and if the uplink PPDU length is greater than the second threshold, the AP 105 may, at 530, select a nominal DL/UL split and then continue to monitor the PPDU length. If the downlink PPDU length is not greater than the first threshold and/or if the uplink PPDU length is not greater than the second threshold, the AP 105 may determine, at 535, whether the downlink PPDU length is less than the first threshold and if the uplink PPDU length is less than the second threshold. If the downlink PPDU length is less than the first threshold and the uplink PPDU length is less than the second threshold, the AP 105 may, at 530, select a nominal DL/UL split and then continue to monitor the PPDU length. The nominal DL/UL split may be predetermined. For example, the DL/UL split may be 2:1.

If the downlink PPDU length is not less than the first threshold and/or if the uplink PPDU length is not less than the second threshold, the AP 105 may determine, at 540, whether the downlink PPDU length is greater than the first threshold and if the uplink PPDU length is less than the second threshold. If the downlink PPDU length is greater than the first threshold and the uplink PPDU length is less than the second threshold, the AP 105 may, at 545, schedule the UL/DL split so that the downlink is served and the uplink is not served (e.g., AP 105 may suspend uplink communications). The AP 105 may continue serve the downlink until it has been determined at 550 that an uplink delay (e.g., an average or maximum uplink delay) exceeds, or is anticipated to exceed, a nominal service delay threshold (e.g., 10 ms). The AP 105 may then continue to monitor the selected parameter.

If the downlink PPDU length is not greater than the first threshold and/or if the uplink PPDU length is not less than the second threshold, the AP 105 may determine, at 555, whether the downlink PPDU length is less than the first threshold and whether the uplink PPDU length is greater than the second threshold. If the downlink PPDU length is less than the first threshold and the uplink PPDU length is greater than the second threshold, the AP 105 may, at 560, schedule the UL/DL split so that the uplink is served and the downlink is not served (e.g., the AP 105 may suspend downlink communications). The AP 105 may continue serve the uplink until it has been determined, at 565, that a downlink delay (e.g., an average or maximum downlink delay) exceeds, or is anticipated to exceed, a nominal service delay threshold. The AP 105 may then continue to monitor the selected parameter. If the downlink PPDU length is not less than the first threshold and the uplink PPDU length is not greater than the second threshold, the AP 105 may determine that the downlink PPDU length and the uplink PPDU length are equal, or nearly equal. In such a scenario, the AP 105 may deduce that the respective delays for uplink and downlink traffic are also equal. Therefore, the AP 105 may continue to monitor the selected parameter.

In some examples, some or all aspects of process flow 500 for dynamic adjustment of downlink and uplink traffic scheduling may be used for UDP traffic.

Figure 6:
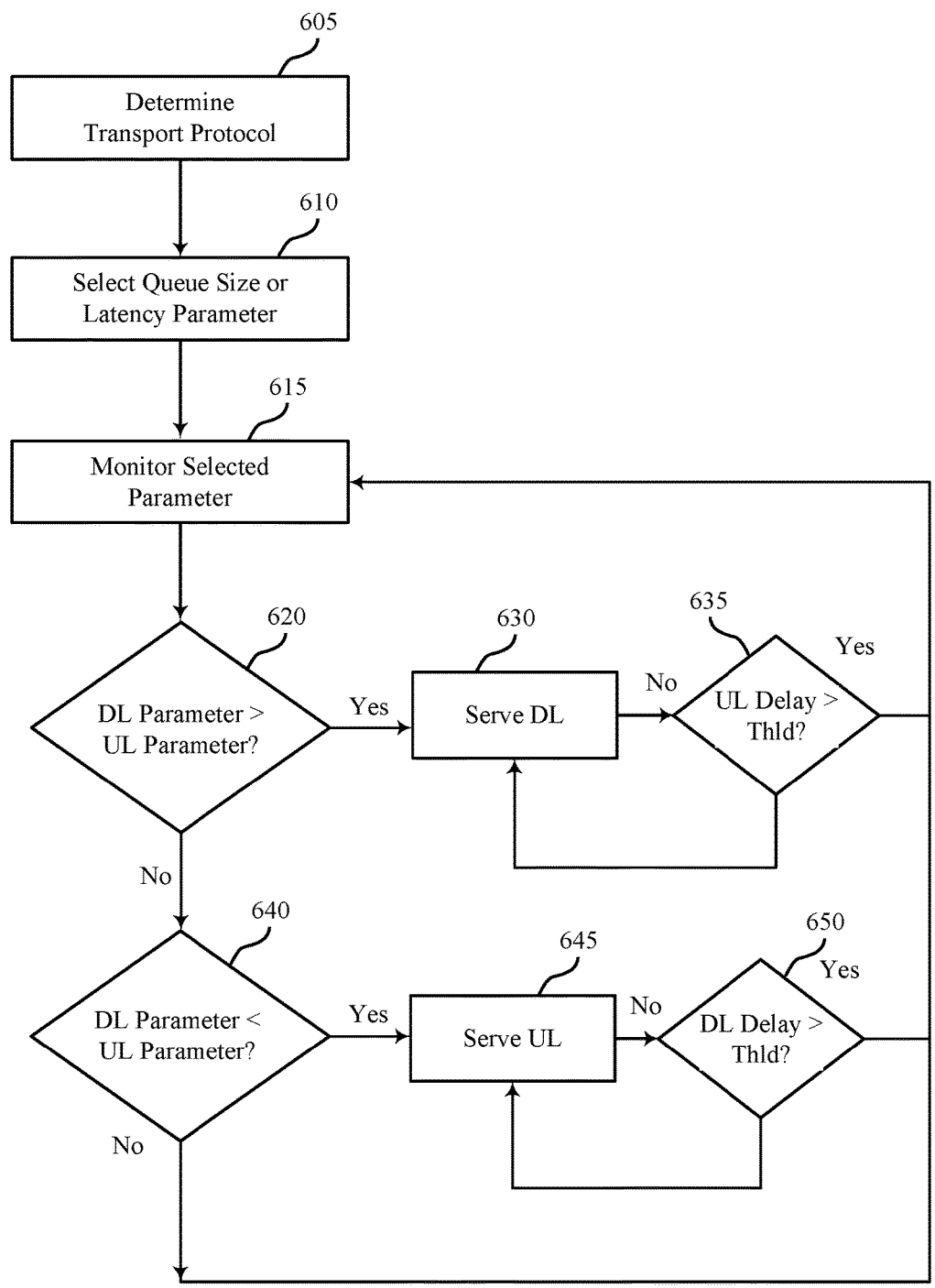
FIG. 6 illustrates an example of a process flow for dynamic adjustment of downlink and uplink traffic scheduling in accordance with aspects of the present disclosure.

FIG. 6 illustrates an example of a process flow 600 for dynamic adjustment of downlink and uplink traffic scheduling in accordance with aspects of the present disclosure. An AP 105 may perform the operations of process flow 600 to dynamically adjust the DL/UL split for individual transmission opportunities over an unlicensed channel.

At 605, the AP 105 may determine the transport layer protocol to be used in subsequent communication. At 610, the AP 105 may select, based on the transport layer protocol being UDP, queue size of latency as a parameter to monitor. In some cases, the parameter may be selected irrespective of the transport layer protocol. At 615, the AP may monitor the selected parameter for downlink traffic and for uplink traffic. For example, the AP 105 may determine the queue size or latency of each direction of traffic. When queue size is the selected parameter, the size of the downlink queue may be referred to as the value of the selected parameter for the downlink and the size of the uplink queue may be referred to as the value for the selected parameter for the uplink. When latency is the selected parameter, the latency of downlink traffic may be referred to as the value of the selected parameter for the downlink and the latency of the uplink traffic may be referred to as the value for the selected parameter for the uplink. Monitoring the parameter may include analyzing or evaluating downlink and uplink traffic, and/or receiving information indicative of the parameter from a STA 115.

At 620, the AP 105 may compare respective values of the parameter to each other to determine whether the downlink parameter value is greater than the uplink parameter value. For example, the AP 105 may compare the downlink queue size to the uplink queue size, or the downlink latency to the uplink latency. If the downlink parameter value is greater than the uplink parameter value, the AP 105 may, at 630, schedule the UL/DL split so that the downlink is served and the uplink is not scheduled for transmissions to the AP 105. The AP 105 may continue serve the downlink until it has been determined, at 635, that an uplink delay (e.g., an average or maximum uplink delay) exceeds, or is anticipated to exceed, a nominal service delay threshold. The AP 105 may then continue to monitor the selected parameter.

If the downlink parameter value is not greater than the uplink parameter value, the AP 105 may, at 640, determine whether the downlink parameter value is less than the uplink parameter value. If the downlink parameter value is less than the uplink parameter value, the AP 105 may, at 645, schedule the UL/DL split so that the uplink is served and the downlink is not served. The AP 105 may continue serve the uplink until it has been determined, at 650, that a downlink delay (e.g., an average or maximum downlink delay) exceeds, or is anticipated to exceed, a nominal service delay threshold. The AP 105 may then continue to monitor the selected parameter. If the downlink parameter value is not less than the uplink parameter value, the AP 105 may determine that the downlink parameter value and the uplink parameter value are equal, or nearly equal. The AP 105 may then continue to monitor the selected parameter.

In some cases, the AP 105 may select the DL/UL split based on a different parameter. For example, the AP 105 may monitor the number of downlink users, or the amount of downlink traffic, that is associated with a high prioritization or ranking (e.g., a high quality of service (QoS) access category (AC)). A user, or traffic, that is assigned a high ranking may be delay sensitive or delay-intolerant. The AP 105 may compare the number of downlink users (or downlink traffic) that are associated with the high ranking to the number of uplink users (or uplink traffic) that are associated with the high ranking. If the number of downlink users (or downlink traffic) is greater than the number of uplink users (or uplink traffic), the AP 105 may select a DL/UL split ratio that is greater than 1 (e.g., more time may be allocated to the downlink than the uplink). If the number of downlink users (or downlink traffic) is less than the number of uplink users (or uplink traffic), the AP 105 may select a DL/UL split ratio that is less than 1 (e.g., more time may be allocated to the uplink than the downlink).

Figure 7:
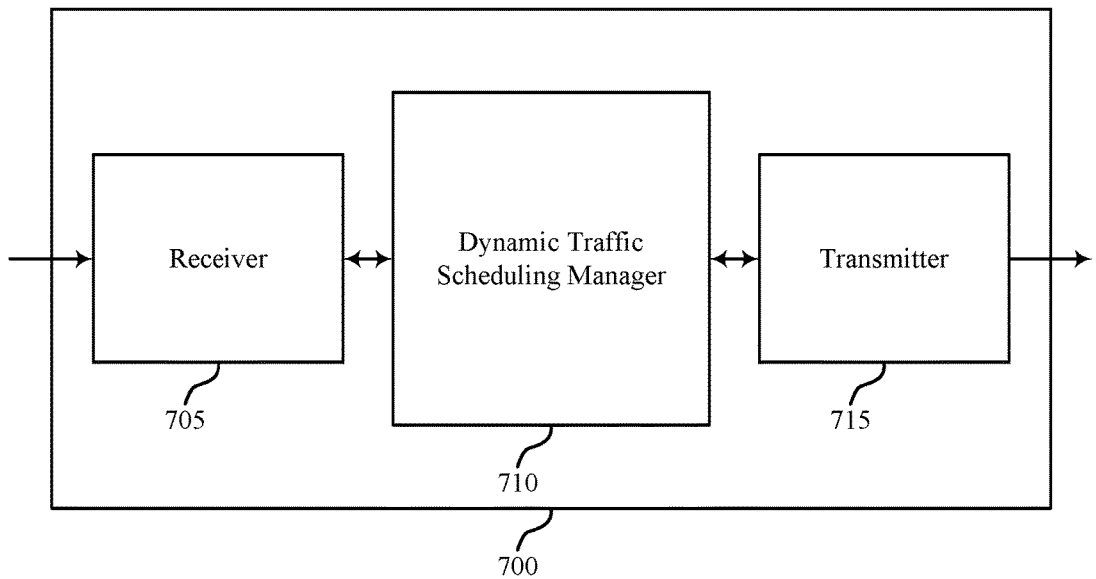
FIGS. 7 and 8 show diagrams of wireless devices that support dynamic adjustment of downlink and uplink traffic scheduling in accordance with aspects of the present disclosure.

FIG. 7 shows a diagram of a wireless device 700 that supports dynamic adjustment of downlink and uplink traffic scheduling in accordance with aspects of the present disclosure. Wireless device 700 may be an example of aspects of an AP 105 described with reference to FIGS. 1-6. Wireless device 700 may include receiver 705, dynamic traffic scheduling manager 710 and transmitter 715. Wireless device 700 may also include one or more processors, memory coupled with the one or more processors, and instructions stored in the memory that are executable by the one or more processors to enable the one or more processors to perform the dynamic adjustment features discussed herein. Each of these components may be in communication with each other.

The receiver 705 may receive information such as packets, user data, or control information associated with various information channels (e.g., control channels, data channels, and information related to dynamic adjustment of downlink and uplink traffic scheduling, etc.). In some cases, the receiver 705 may receive information (e.g., from a STA 115) associated with an uplink traffic parameter. For example, the receiver 705 may receive an indication of a downlink delivery rate or an uplink departure rate. Additionally or alternatively, the receiver 705 may receive an indication of an uplink queue size (e.g., an uplink traffic queue size, and uplink acknowledgement queue size and/or an uplink data queue size). In some examples, the receiver 705 may receive an indication of the number of users (e.g., STAs 115) or uplink traffic associated with a particular rank, prioritization, or access category (e.g., related for QoS). The receiver 705 may also receive an indication of latency associated with uplink traffic. Information may be passed on to other components of the device. The receiver 705 may be an example of aspects of the transceiver 1025 described with reference to FIG. 10.

The dynamic traffic scheduling manager 710 may monitor a parameter for downlink traffic and for uplink traffic. The dynamic traffic scheduling manager 710 may also determine that a contention for access to an unlicensed RF spectrum band (e.g., an unlicensed channel) for a transmission opportunity has succeeded. The dynamic traffic scheduling manager 710 may adjust scheduling for a downlink communications duration and an uplink communications duration for the transmission opportunity based on a comparison of a first value associated with the monitored parameter for downlink traffic and a second value associated with the monitored parameter for uplink traffic. The dynamic traffic scheduling manager 710 may also be an example of aspects of the dynamic traffic scheduling manager 1005 described with reference to FIG. 10.

The transmitter 715 may transmit signals received from other components of wireless device 700. In some examples, the transmitter 715 may be collocated with a receiver in a transceiver module. For example, the transmitter 715 may be an example of aspects of the transceiver 1025 described with reference to FIG. 10. The transmitter 715 may include a single antenna, or it may include a plurality of antennas.

Figure 8:
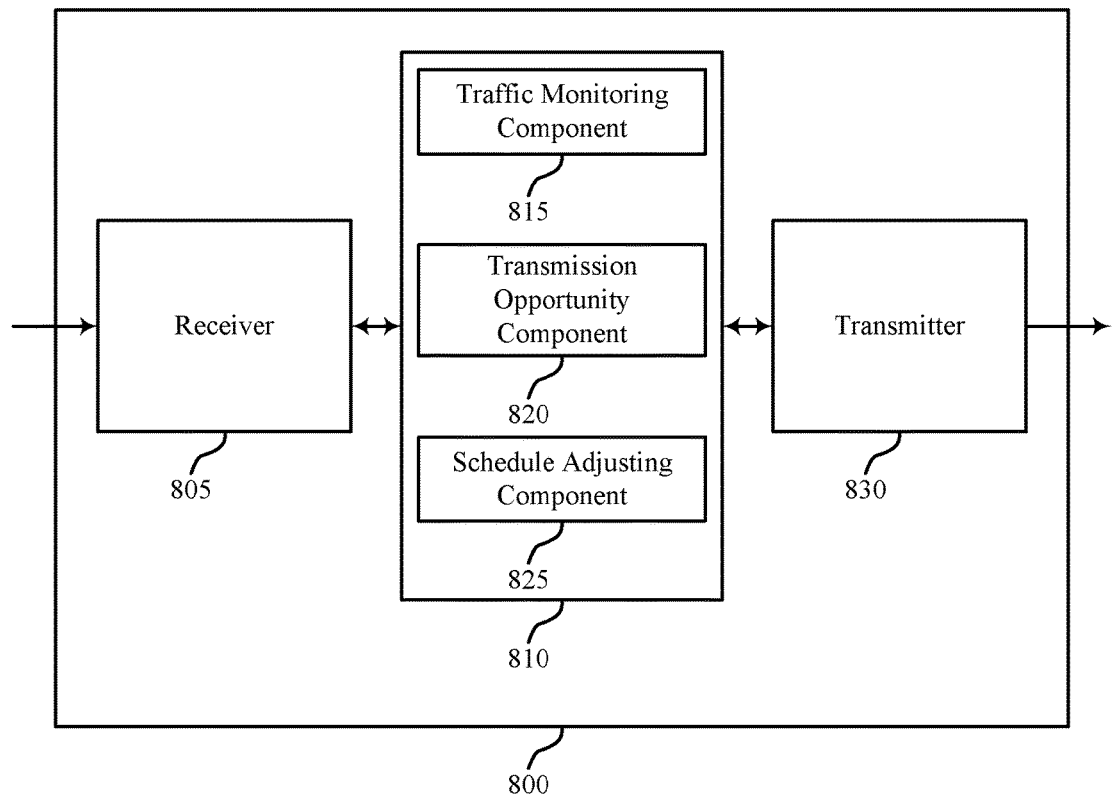

FIG. 8 shows a diagram of a wireless device 800 that supports dynamic adjustment of downlink and uplink traffic scheduling in accordance with aspects of the present disclosure. Wireless device 800 may be an example of aspects of a wireless device 700 or an AP 105 described with reference to FIGS. 1, 2, and 7. Wireless device 800 may include receiver 805, dynamic traffic scheduling manager 810 and transmitter 830. Wireless device 800 may also include a processor. Each of these components may be in communication with each other.

The receiver 805 may receive information which may be passed on to other components of the device. The receiver 805 may also perform the functions described with reference to the receiver 705 of FIG. 7. The receiver 805 may be an example of aspects of the transceiver 1025 described with reference to FIG. 10. The transmitter 830 may transmit signals received from other components of wireless device 800. In some examples, the transmitter 830 may be collocated with a receiver in a transceiver module. For example, the transmitter 830 may be an example of aspects of the transceiver 1025 described with reference to FIG. 10. The transmitter 830 may utilize a single antenna, or it may utilize a plurality of antennas.

The dynamic traffic scheduling manager 810 may be an example of aspects of dynamic traffic scheduling manager 710 described with reference to FIG. 7. The dynamic traffic scheduling manager 810 may include traffic monitoring component 815, transmission opportunity component 820 and schedule adjusting component 825. The dynamic traffic scheduling manager 810 may be an example of aspects of the dynamic traffic scheduling manager 1005 described with reference to FIG. 10.

The traffic monitoring component 815 may monitor a parameter for downlink traffic and for uplink traffic. In some cases, the parameter includes a downlink PPDU length. The parameter may be a delay, a queue size, or a number of users assigned a highest QoS access category. In some cases, the monitoring includes monitoring a downlink queue and an uplink queue. The downlink queue may include downlink data and/or downlink acknowledgements for uplink data. The uplink queue may include uplink data and/or uplink acknowledgments for downlink data. In some cases, the monitoring includes monitoring a downlink data queue, a downlink acknowledgment queue, an uplink data queue, and an uplink acknowledgment queue. In some cases, the traffic monitoring component 815 may be a processor (e.g., a transceiver processor, or a radio processor, or a receiver processor). The processor may be coupled with memory and execute instructions stored in the memory that enable the processor to perform or facilitate the parameter monitoring features discussed herein. A transceiver processor may be collocated with and/or communicate with (e.g., direct the operations of) a transceiver of the wireless device 800. A radio processor may be collocated with and/or communicate with (e.g., direct the operations of) a radio (e.g., a Wi-Fi radio) of the wireless device 800. A receiver processor may be collocated with and/or communicate with (e.g., direct the operations of) a receiver (e.g., receiver 805) of the wireless device 800.

The transmission opportunity component 820 may determine that a contention for access to an unlicensed RF spectrum band (e.g., an unlicensed channel) for a transmission opportunity has succeeded. In some cases, the transmission opportunity component 820 may be a processor (e.g., a transceiver processor, or a radio processor, or a receiver processor). The processor may be coupled with memory and execute instructions stored in the memory that enable the processor to perform or facilitate the transmission opportunity determination features discussed herein.

The schedule adjusting component 825 may adjust scheduling for a downlink communications duration and an uplink communications duration for the transmission opportunity based on a comparison of a first value associated with the monitored parameter for downlink traffic and a second value associated with the monitored parameter for uplink traffic. The schedule adjusting component 825 may adjust scheduling based at least in part on the size of the downlink queue and the size of the uplink queue. In some cases (e.g., when the parameter is PPDU length), the schedule adjusting component 825 may determine whether the first value satisfies a predetermined downlink PPDU length threshold and whether the second value satisfies a predetermined uplink PPDU length threshold. The schedule adjusting component 825 may schedule the downlink communications duration and the uplink communications duration for the transmission opportunity based on the determination. In some cases, the schedule adjusting component 825 may be a processor. The processor may be coupled with memory and execute instructions stored in the memory that enable the processor to perform or facilitate the downlink and uplink scheduling features discussed herein.

In some cases (e.g., when the parameter is queue size or latency), the schedule adjusting component 825 may determine that the first value is greater than the second value and suspending uplink communications based on the determination. In some cases (e.g., when the parameter is queue size or latency), the schedule adjusting component 825 may determine that the second value is greater than the first value and suspending downlink communications based on the determination. The first and second values may be average values or a maximum values. The schedule adjusting component 825 may adjust scheduling based downlink data queue size, downlink acknowledgment queue size, uplink data queue size, and/or uplink acknowledgment queue size. In some cases, the schedule adjusting component may prioritize an acknowledgment queue over a data queue.

Figure 9:
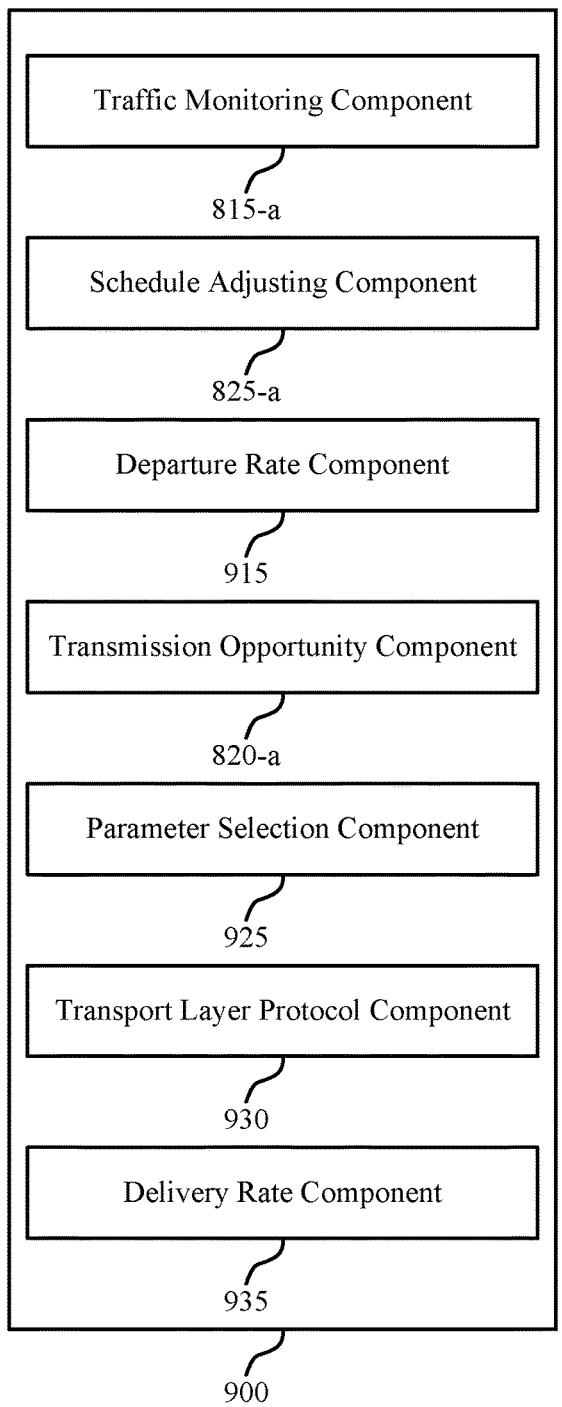
FIG. 9 shows a diagram of a dynamic traffic scheduling manager in accordance with aspects of the present disclosure.

FIG. 9 shows a diagram of a dynamic traffic scheduling manager 900, which may be an example of the corresponding component of wireless device 700 or wireless device 800, in accordance with aspects of the present disclosure. That is, dynamic traffic scheduling manager 900 may be an example of aspects of dynamic traffic scheduling manager 710 or dynamic traffic scheduling manager 810 described with reference to FIGS. 7 and 8. The dynamic traffic scheduling manager 900 may also be an example of aspects of the dynamic traffic scheduling manager 1005 described with reference to FIG. 10.

The dynamic traffic scheduling manager 900 may include traffic monitoring component 815-*a*, schedule adjusting component 825-*a*, departure rate component 915, transmission opportunity component 820-*a*, parameter selection component 925, transport layer protocol component 930 and delivery rate component 935. Each of these modules may communicate, directly or indirectly, with one another (e.g., via one or more buses).

The traffic monitoring component 815-*a* may monitor a parameter for downlink traffic and for uplink traffic as described with reference to FIG. 8. In some cases, the parameter is PPDU length. The schedule adjusting component 825-*a* may adjust scheduling for a downlink communications duration and an uplink communications duration for the transmission opportunity based on a comparison of a first value associated with the monitored parameter for downlink traffic and a second value associated with the monitored parameter for uplink traffic.

The departure rate component 915 may determine departure rates for the uplink traffic and the downlink traffic. The schedule adjusting component 825-a may adjust scheduling based on the determined departure rates. In some cases, the departure rate component 915 may be a processor (e.g., a transceiver processor, or a radio processor, or a transmitter processor). The processor may be coupled with memory and execute instructions stored in the memory that enable the processor to perform or facilitate the parameter monitoring features discussed herein. A transmitter processor may be collocated with and/or communicate with (e.g., direct the operations of) a transmitter of the wireless device that includes the dynamic traffic scheduling manager 900.

The delivery rate component 935 may determine delivery rates for the uplink traffic and the downlink traffic. In some cases, the delivery rate component 935 may be a processor (e.g., a transceiver processor, or a radio processor, or a receiver processor). The processor may be coupled with memory and execute instructions stored in the memory that enable the processor to perform or facilitate the parameter monitoring features discussed herein. The schedule adjusting component 825-a may adjust scheduling based on the determined delivery rates. The transmission opportunity component 820-a may determine when a contention for access to an unlicensed radio frequency spectrum band for a transmission opportunity has succeeded. The transport layer protocol component 930 may determine a transport layer protocol for the downlink traffic and the uplink traffic. The parameter selection component 925 may select a parameter to monitor based on the determined transport layer protocol. The transport layer protocol may be a UDP transport layer protocol or a TCP transport layer protocol. In some cases, the transport layer protocol component 930 and/or the parameter selection component 925 may be a processor (e.g., a transceiver processor, or a radio processor, a receiver processor, or a transmitter processor). The processor may be coupled with memory and execute instructions stored in the memory that enable the processor to perform or facilitate the features discussed herein.

Figure 10:
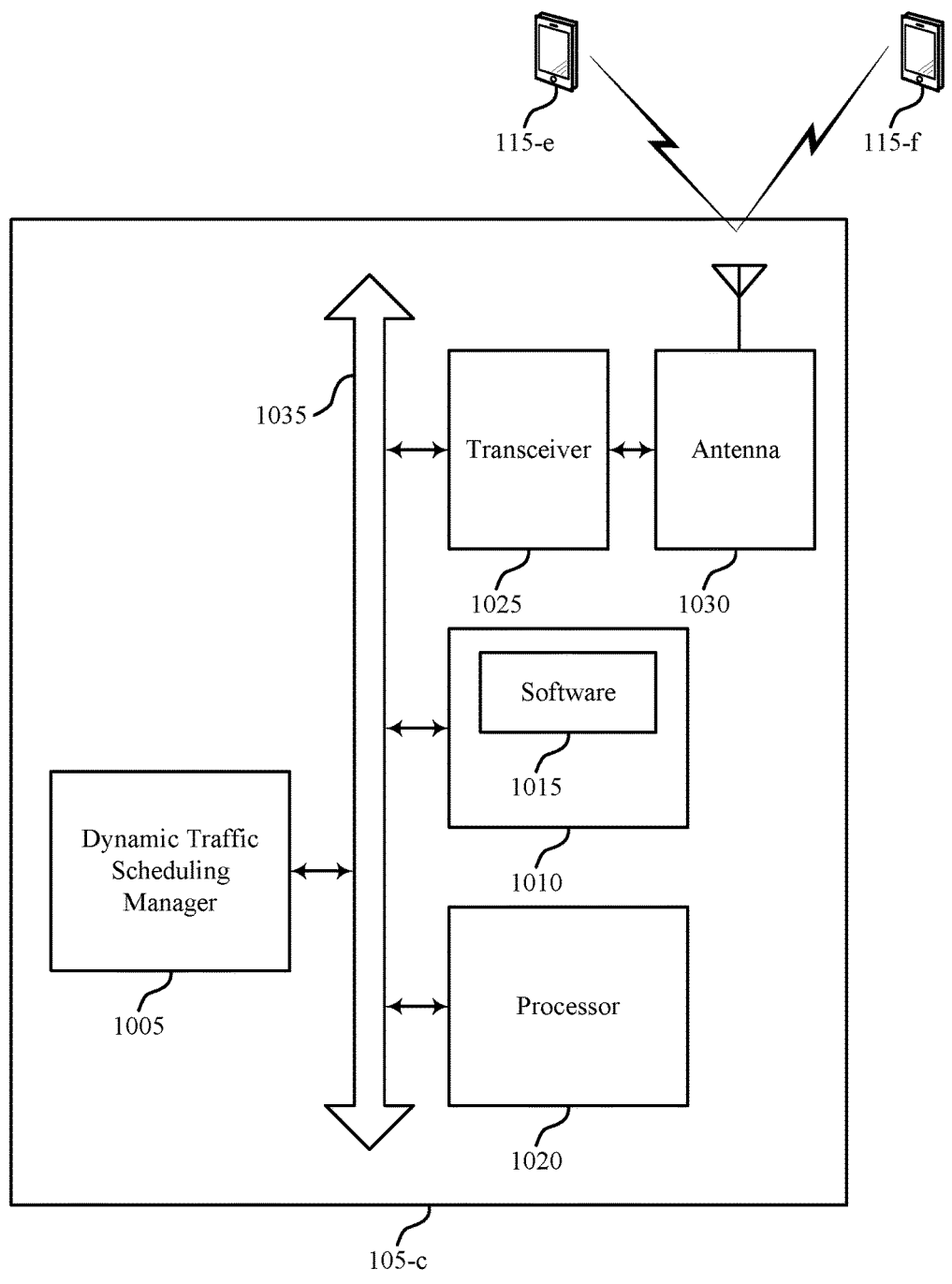
FIG. 10 illustrates a diagram of a system including an AP that supports dynamic adjustment of downlink and uplink traffic scheduling in accordance with aspects of the present disclosure.

FIG. 10 shows a diagram of a system 1000 including a device that supports dynamic adjustment of downlink and uplink traffic scheduling in accordance with aspects of the present disclosure. For example, system 1000 may include AP 105-c, which may be an example of a wireless device 700, a wireless device 800, or an AP 105 as described with reference to FIGS. 1-9.

AP 105-c may also include dynamic traffic scheduling manager 1005, memory 1010, processor 1020, transceiver 1025, and antenna 1030. Each of these modules may communicate, directly or indirectly, with one another (e.g., via one or more buses 1035). The dynamic traffic scheduling manager 1005 may be an example of a dynamic traffic scheduling manager as described with reference to FIGS. 7 through 9.

The memory 1010 may include random access memory (RAM) and read only memory (ROM). The memory 1010 may store computer-readable, computer-executable software including instructions that, when executed, cause the processor to perform various functions described herein (e.g., dynamic adjustment of downlink and uplink traffic scheduling, etc.). In some cases, the software 1015 may not be directly executable by the processor but may cause a computer (e.g., when compiled and executed) to perform functions described herein. The processor 1020 may include an intelligent hardware device, (e.g., a central processing unit (CPU), a microcontroller, an application specific integrated circuit (ASIC), etc.).

The transceiver 1025 may communicate bi-directionally, via one or more antennas, wired, or wireless links, with one or more networks, as described above. For example, the transceiver 1025 may communicate bi-directionally with an AP 105 or a STA 115. The transceiver 1025 may also include a modem to modulate the packets and provide the modulated packets to the antennas for transmission, and to demodulate packets received from the antennas. In some cases, the wireless device may include a single antenna 1030. However, in some cases the device may have more than one antenna 1030, which may be capable of concurrently transmitting or receiving multiple wireless transmissions.

Figure 11:
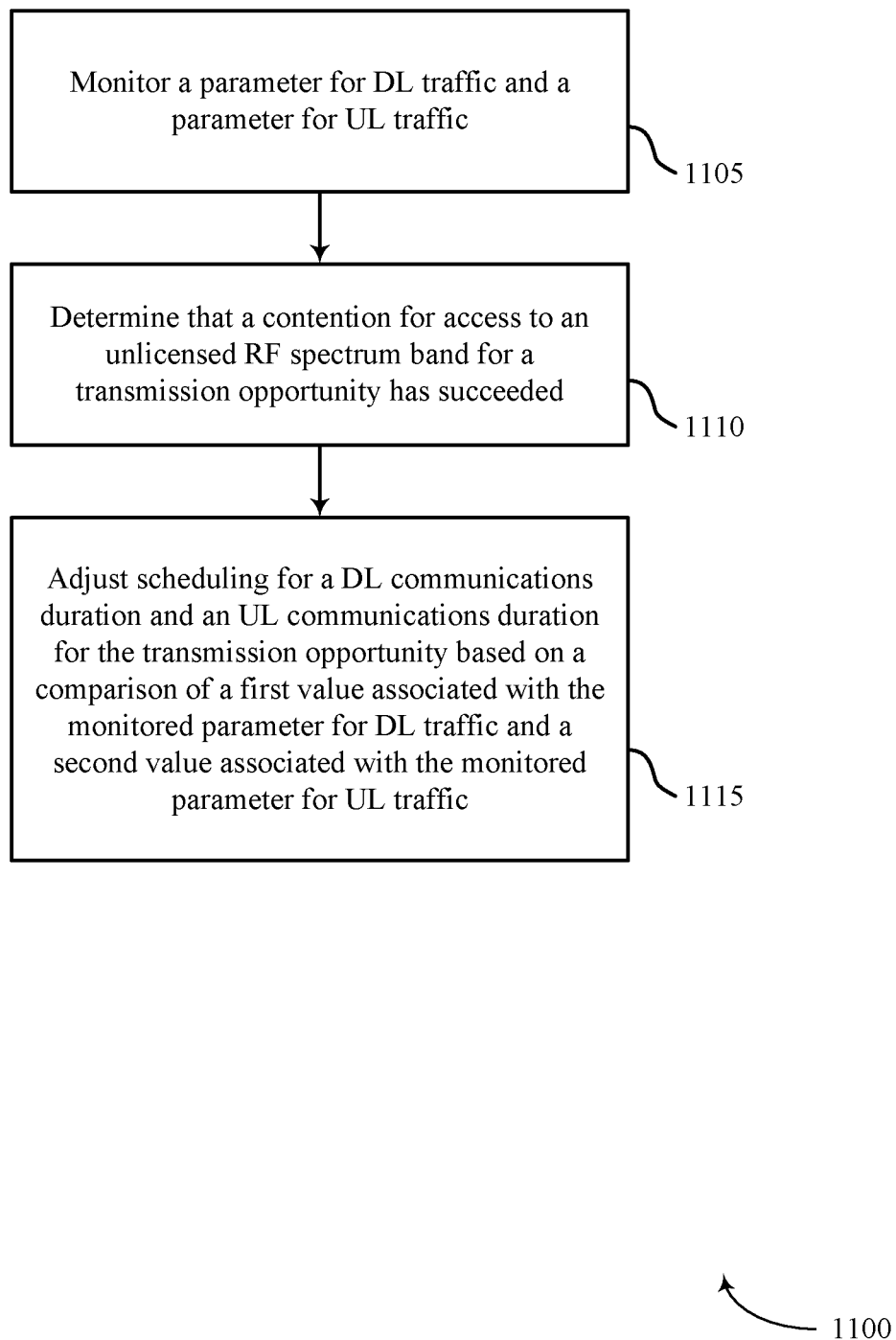
FIGS. 11 through 13 illustrate methods for dynamic adjustment of downlink and uplink traffic scheduling in accordance with aspects of the present disclosure.

FIG. 11 shows a flowchart illustrating a method 1100 for dynamic adjustment of downlink and uplink traffic scheduling in accordance with aspects of the present disclosure. The operations of method 1100 may be implemented by a device such as an AP 105 or its components as described with reference to FIGS. 1 and 2. For example, the operations of method 1100 may be performed by the dynamic traffic scheduling manager as described herein. In some examples, the AP 105 may execute a set of codes to control the functional elements of the device to perform the functions described below. Additionally or alternatively, the AP 105 may perform aspects the functions described below using special-purpose hardware.

At block 1105, the AP 105 may monitor a parameter for downlink traffic and a parameter for uplink traffic as described above with reference to FIGS. 2 through 6. In certain examples, the operations of block 1105 may be performed or facilitated by the traffic monitoring component as described with reference to FIG. 8. At block 1110, the AP 105 may determine that a contention for access to an unlicensed RF spectrum band for a transmission opportunity has succeeded as described above with reference to FIGS. 2 through 6. In certain examples, the operations of block 1110 may be performed or facilitated by the transmission opportunity component as described with reference to FIG. 8. At block 1115, the AP 105 may adjust scheduling for a downlink communications duration and an uplink communications duration for the transmission opportunity based on a comparison of a first value associated with the monitored parameter for downlink traffic and a second value associated with the monitored parameter for uplink traffic as described above with reference to FIGS. 2 through 6. In certain examples, the operations of block 1115 may be performed or facilitated by the schedule adjusting component as described with reference to FIG. 8.

Figure 12:
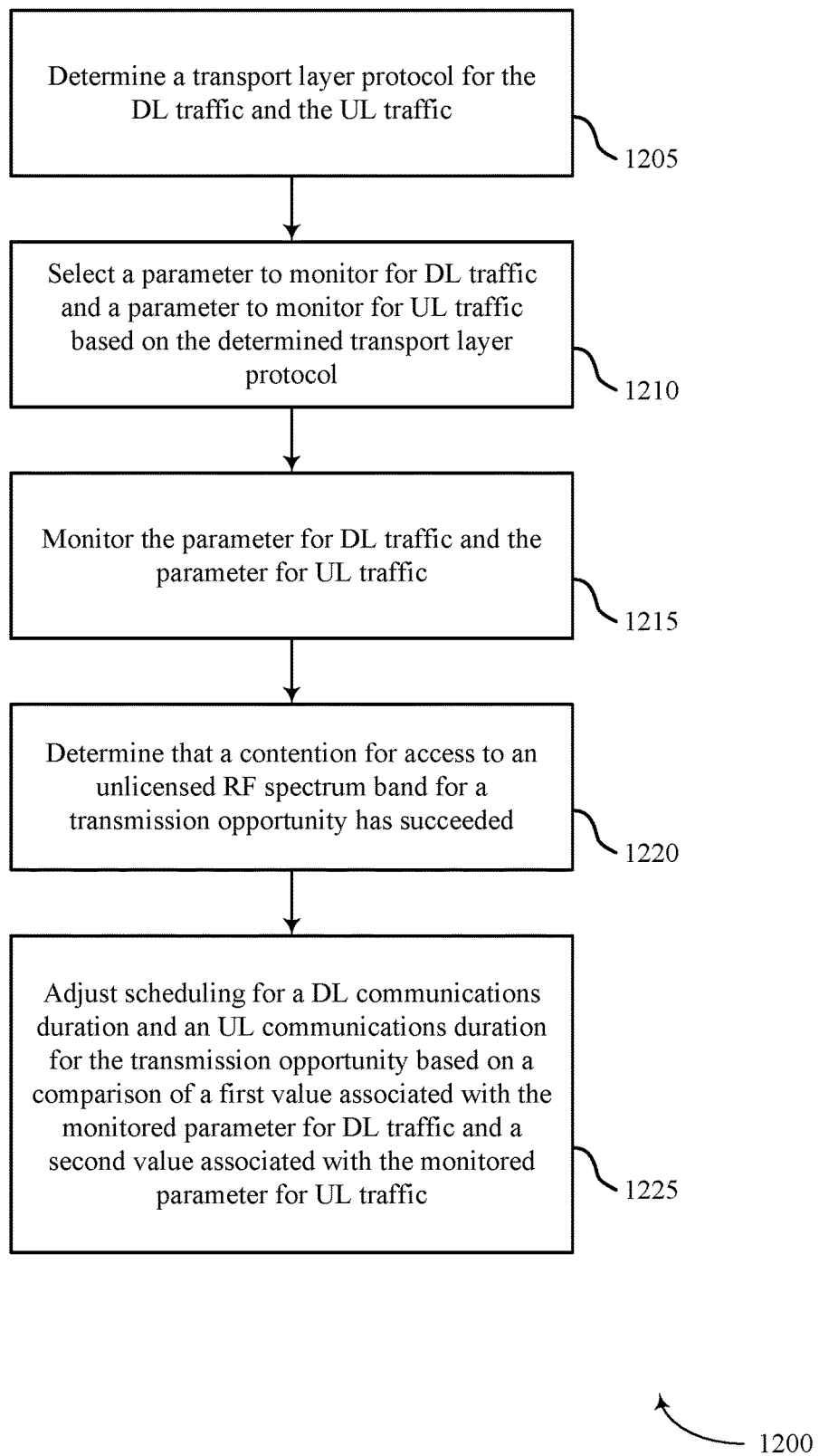

FIG. 12 shows a flowchart illustrating a method 1200 for dynamic adjustment of downlink and uplink traffic scheduling in accordance with aspects of the present disclosure. The operations of method 1200 may be implemented by a device such as an AP 105 or its components as described with reference to FIGS. 1 and 2. For example, the operations of method 1200 may be performed by the dynamic traffic scheduling manager as described herein. In some examples, the AP 105 may execute a set of codes to control the functional elements of the device to perform the functions described below. Additionally or alternatively, the AP 105 may perform aspects the functions described below using special-purpose hardware.

At block 1205, the AP 105 may determine a transport layer protocol for the downlink traffic and the uplink traffic as described above with reference to FIGS. 2 through 6. In certain examples, the operations of block 1205 may be performed or facilitated by the transport layer protocol component as described with reference to FIG. 8. At block 1210, the AP 105 may select a parameter to monitor for downlink traffic and a parameter to monitor for uplink traffic based on the determined transport layer protocol as described above with reference to FIGS. 2 through 6. In certain examples, the operations of block 1210 may be performed or facilitated by the parameter selection component as described with reference to FIG. 8.

At block 1215, the AP 105 may monitor the selected parameter for downlink traffic and the selected parameter for uplink traffic as described above with reference to FIGS. 2 through 6. In certain examples, the operations of block 1215 may be performed or facilitated by the traffic monitoring component as described with reference to FIG. 8. At block 1220, the AP 105 may determine that a contention for access to an unlicensed RF spectrum band for a transmission opportunity has succeeded as described above with reference to FIGS. 2 through 6. In certain examples, the operations of block 1220 may be performed or facilitated by the transmission opportunity component as described with reference to FIG. 8. At block 1225, the AP 105 may adjust scheduling for a downlink communications duration and an uplink communications duration for the transmission opportunity based on a comparison of a first value associated with the monitored parameter for downlink traffic and a second value associated with the monitored parameter for uplink traffic as described above with reference to FIGS. 2 through 6. In certain examples, the operations of block 1225 may be performed or facilitated by the schedule adjusting component as described with reference to FIG. 8.

Figure 13:
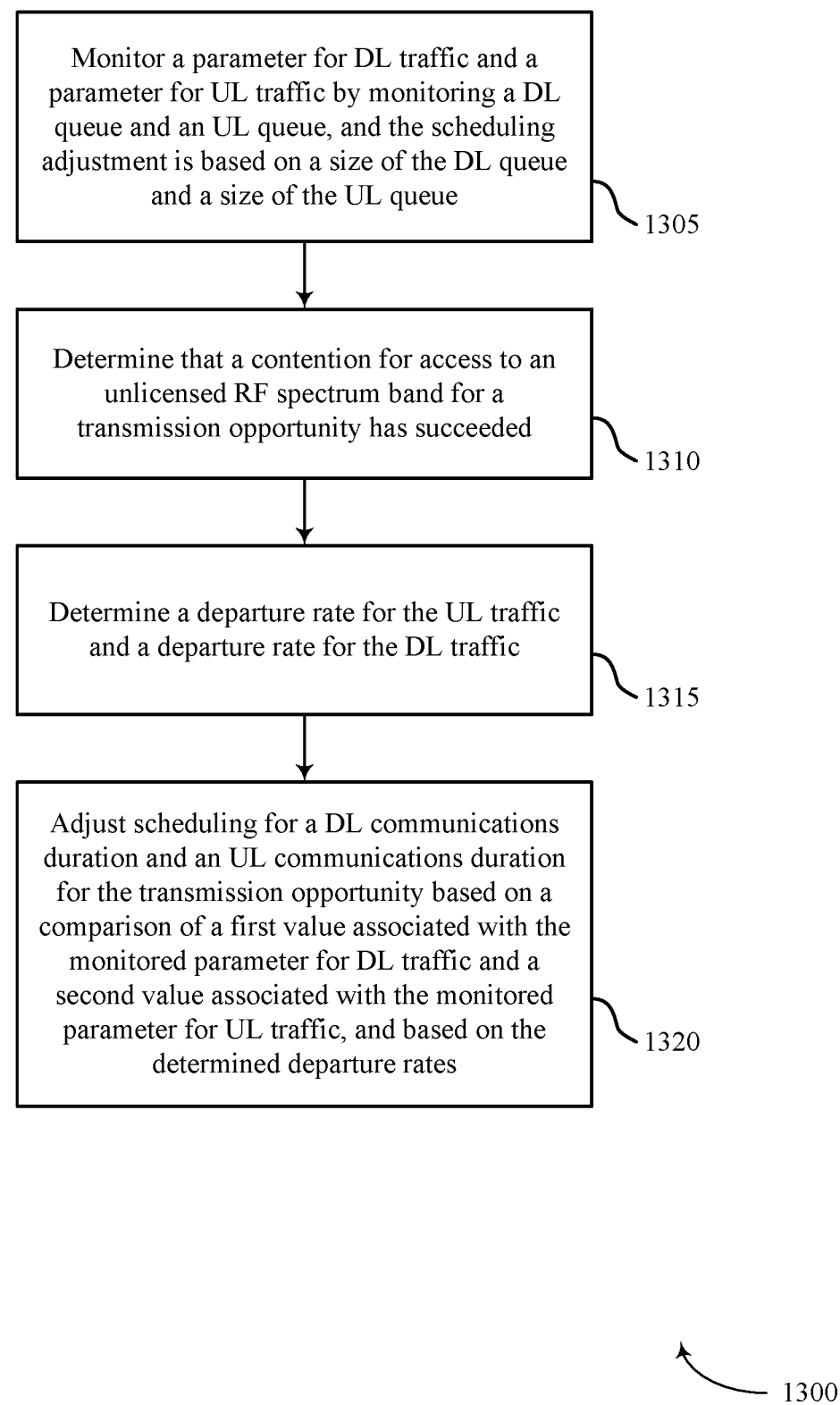

FIG. 13 shows a flowchart illustrating a method 1300 for dynamic adjustment of downlink and uplink traffic scheduling in accordance with aspects of the present disclosure. The operations of method 1300 may be implemented by a device such as an AP 105 or its components as described with reference to FIGS. 1 and 2. For example, the operations of method 1300 may be performed by the dynamic traffic scheduling manager as described herein. In some examples, the AP 105 may execute a set of codes to control the functional elements of the device to perform the functions described below. Additionally or alternatively, the AP 105 may perform aspects the functions described below using special-purpose hardware.

At block 1305, the AP 105 may monitor a parameter for downlink traffic and a parameter for uplink traffic as described above with reference to FIGS. 2 through 6. In some cases, the monitoring includes monitoring a downlink queue and an uplink queue, and the scheduling adjustment is based on a size of the downlink queue and a size of the uplink queue. In certain examples, the operations of block 1305 may be performed or facilitated by the traffic monitoring component as described with reference to FIG. 8. At block 1310, the AP 105 may determine that a contention for access to an unlicensed RF spectrum band for a transmission opportunity has succeeded as described above with reference to FIGS. 2 through 6. In certain examples, the operations of block 1310 may be performed or facilitated by the transmission opportunity component as described with reference to FIG. 8.

At block 1315, the AP 105 may determine a departure rate for the uplink traffic and a departure rate for the downlink traffic, where the scheduling adjustment is further based on the determined departure rates as described above with reference to FIGS. 2 through 6. In certain examples, the operations of block 1315 may be performed or facilitated by the departure rate component as described with reference to FIG. 8. At block 1320, the AP 105 may adjust scheduling for a downlink communications duration and an uplink communications duration for the transmission opportunity based on a comparison of a first value associated with the monitored parameter for downlink traffic and a second value associated with the monitored parameter for uplink traffic as described above with reference to FIGS. 2 through 6. The adjustment may also be based on the determine departure rates. In certain examples, the operations of block 1320 may be performed or facilitated by the schedule adjusting component as described with reference to FIG. 8.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for dynamic adjustment of downlink and uplink traffic scheduling.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Thus, aspects of the disclosure may provide for dynamic adjustment of downlink and uplink traffic scheduling. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. An apparatus for wireless communication, comprising:
a memory that stores instructions; and
a processor coupled with the memory, wherein the processor and the memory are configured to:
monitor a parameter for downlink (DL) traffic and a parameter for uplink (UL) traffic;
determine that a contention procedure for contention-based access to an unlicensed radio frequency (RF) spectrum band for a transmission opportunity has succeeded, wherein the contention procedure reserves the unlicensed RF spectrum band for a duration of the transmission opportunity; and
adjust scheduling for a DL communications duration and an UL communications duration within the duration of the transmission opportunity based at least in part on a comparison of a first value associated with the monitored parameter for DL traffic and a second value associated with the monitored parameter for UL traffic.

2. The apparatus of claim 1, wherein the processor and memory are further configured to:
determine a transport layer protocol for the DL traffic and the UL traffic; and
select the parameter for DL traffic and the parameter for UL traffic to monitor based at least in part on the determined transport layer protocol.

3. The apparatus of claim 2, wherein the transport layer protocol comprises a user datagram protocol (UDP) or a transmission control protocol (TCP).

4. The apparatus of claim 1, wherein the parameter for DL traffic comprises a DL physical layer convergence protocol (PLCP) protocol data unit (PPDU) length and the parameter for UL traffic comprises an UL PPDU length, and wherein the processor and memory are configured to adjust the scheduling by being configured to:
determine whether the first value satisfies a predetermined DL PPDU length threshold;
determine whether the second value satisfies a predetermined UL PPDU length threshold; and
schedule the DL communications duration and the UL communications duration for the transmission opportunity based at least in part on the determinations of threshold satisfaction.

5. The apparatus of claim 1, wherein the parameter for DL traffic is at least one of a DL delay, or a DL queue size, or a combination thereof, wherein the parameter for UL traffic is at least one of an UL delay, or an UL queue size, or a combination thereof, and wherein the processor and memory are configured to adjust the scheduling by being configured to:
determine that the first value is greater than the second value, and suspend UL communications based at least in part on the determination that the first value is greater than the second value.

6. The apparatus of claim 1, wherein the parameter for DL traffic is at least one of a DL delay, or a DL queue size, or a combination thereof, wherein the parameter for UL traffic is at least one of an UL delay, or an UL queue size, or a combination thereof, and wherein the processor and memory are configured to adjust the scheduling by being configured to:
determine that the second value is greater than the first value, and suspend DL communications based at least in part on the determination that the second value is greater than the first value.

7. The apparatus of claim 6, wherein the first and second values are at least one of an average value, or a maximum value, or a combination thereof.

8. The apparatus of claim 1, wherein the parameter for DL traffic comprises a first number of users assigned a highest quality of service (QoS) access category (AC) associated with the DL traffic, and wherein the parameter for UL traffic comprises a second number of users assigned a highest QoS AC associated with the UL traffic.

9. The apparatus of claim 1, wherein the processor and memory are configured to monitor the parameter for DL traffic and the parameter for UL traffic by being configured to:
monitor a DL queue and an UL queue, wherein the scheduling adjustment is based at least in part on a size of the DL queue and a size of the UL queue.

10. The apparatus of claim 9, wherein:
the DL queue comprises at least one of DL data, or DL acknowledgements for UL data, or a combination thereof; and
the UL queue comprises at least one of UL data, or UL acknowledgements for DL data, or a combination thereof.

11. The apparatus of claim 9, wherein the processor and memory are further configured to:
determine a departure rate for the UL traffic and a departure rate for the DL traffic, wherein the scheduling adjustment is further based at least in part on the determined departure rates.

12. The apparatus of claim 1, wherein the processor and memory are configured to monitor the parameter for DL traffic and the parameter for UL traffic by being configured to monitor a DL data queue, a DL acknowledgment (ACK) queue, an UL data queue, and an UL ACK queue; and
wherein the scheduling adjustment is further based at least in part on a size of the DL data queue, a size of the DL ACK queue, a size of the UL data queue, and a size of the UL ACK queue.

13. The apparatus of claim 12, wherein the processor and memory are further configured to:
determine a delivery rate for the UL traffic and a delivery rate for the DL traffic, wherein the scheduling adjustment is based at least in part on the determined delivery rates.

14. The apparatus of claim 1, wherein the processor and memory are further configured to:
prioritize an acknowledgment queue over a data queue.

15. The apparatus of claim 1, wherein the processor and memory are configured to monitor the parameter for UL traffic by being configured to:
receive, from a station, information associated with the parameter for UL traffic.

16. A method of wireless communication comprising:
monitoring a parameter for downlink (DL) traffic and a parameter for uplink (UL) traffic;
determining that a contention procedure for contention-based access to an unlicensed radio frequency (RF) spectrum band for a transmission opportunity has succeeded, wherein the contention procedure reserves the unlicensed RF spectrum band for a duration of the transmission opportunity; and
adjusting scheduling for a DL communications duration and an UL communications duration within the duration of the transmission opportunity based at least in part on a comparison of a first value associated with the monitored parameter for DL traffic and a second value associated with the monitored parameter for UL traffic.

17. The method of claim 16, further comprising:
determining a transport layer protocol for the DL traffic and the UL traffic; and
selecting the parameter for DL traffic and the parameter for UL traffic to monitor based at least in part on the determined transport layer protocol.

18. The method of claim 16, wherein the parameter for DL traffic comprises a DL physical layer convergence protocol (PLCP) protocol data unit (PPDU) length and the parameter for UL traffic comprises an UL PPDU length; and
adjusting the scheduling comprises determining whether the first value satisfies a predetermined DL PPDU length threshold, and whether the second value satisfies a predetermined UL PPDU length threshold, and scheduling the DL communications duration and the UL communications duration for the transmission opportunity based at least in part on the determinations of threshold satisfaction.

19. The method of claim 16, wherein:
the parameter for DL traffic is at least one of a DL delay, or a DL queue size, or a combination thereof;
the parameter for UL traffic is at least one of an UL delay, or an UL queue size, or a combination thereof; and
adjusting the scheduling further comprises determining that the first value is greater than the second value, and suspending UL communications based at least in part on the determination that the first value is greater than the second value.

20. The method of claim 16, wherein:
the parameter for DL traffic is at least one of a DL delay, or a DL queue size, or a combination thereof;
the parameter for UL traffic is at least one of an UL delay, or an UL queue size, or a combination thereof; and
adjusting the scheduling further comprises determining that the second value is greater than the first value, and suspending DL communications based at least in part on the determination that the second value is greater than the first value.

21. The method of claim 16, wherein the monitoring comprises monitoring a DL queue and an UL queue, and the scheduling adjustment is based at least in part on a size of the DL queue and a size of the UL queue.

22. The method of claim 16, wherein:
the monitoring comprises monitoring a DL data queue, a DL acknowledgment (ACK) queue, an UL data queue, and an UL ACK queue; and
the scheduling adjustment is further based at least in part on a size of the DL data queue, a size of the DL ACK queue, a size of the UL data queue, and a size of the UL ACK queue.

23. The method of claim 22, further comprising:
determining a delivery rate for the UL traffic and a delivery rate for the DL traffic, wherein the scheduling adjustment is based at least in part on the determined delivery rates.

24. An apparatus for wireless communication comprising:
means for monitoring a parameter for downlink (DL) traffic and a parameter for uplink (UL) traffic;
means for determining that a contention procedure for contention-based access to an unlicensed radio frequency (RF) spectrum band for a transmission opportunity has succeeded, wherein the contention procedure reserves the unlicensed RF spectrum band for a duration of the transmission opportunity; and
means for adjusting scheduling for a DL communications duration and an UL communications duration within the duration of the transmission opportunity based at least in part on a comparison of a first value associated with the monitored parameter for DL traffic and a second value associated with the monitored parameter for UL traffic.

25. The apparatus of claim 24, wherein the parameter for DL traffic comprises a DL physical layer convergence protocol (PLCP) protocol data unit (PPDU) length and the parameter for UL traffic comprises an UL PPDU length; and
   wherein the means for adjusting the scheduling comprises:
      means for determining whether the first value satisfies a predetermined DL PPDU length threshold, and whether the second value satisfies a predetermined UL PPDU length threshold; and
      means for scheduling the DL communications duration and the UL communications duration for the transmission opportunity based at least in part on the determinations of threshold satisfaction.

26. The apparatus of claim 24, wherein the parameter for DL traffic is at least one of a DL delay, or a DL queue size, or a combination thereof, and the parameter for UL traffic is at least one of an UL delay, or an UL queue size, or a combination thereof; and
   wherein the means for adjusting the scheduling further comprises:
      means for determining that the second value is greater than the first value; and
      means for suspending DL communications based at least in part on the determination that the second value is greater than the first value.

27. The apparatus of claim 24, wherein the means for monitoring comprises means for monitoring a DL queue and an UL queue, and wherein the scheduling adjustment is based at least in part on a size of the DL queue and a size of the UL queue.

28. A non-transitory computer-readable medium storing code for wireless communication, the code comprising instructions executable to:
   monitor a parameter for downlink (DL) traffic and a parameter for uplink (UL) traffic;
   determine that a contention procedure for contention-based access to an unlicensed radio frequency (RF) spectrum band for a transmission opportunity has succeeded, wherein the contention procedure reserves the unlicensed RF spectrum band for a duration of the transmission opportunity; and
   adjust scheduling for a DL communications duration and an UL communications duration within the duration of the transmission opportunity based at least in part on a comparison of a first value associated with the monitored parameter for DL traffic and a second value associated with the monitored parameter for UL traffic.

29. The non-transitory computer-readable medium of claim 28, wherein the parameter for DL traffic comprises a DL physical layer convergence protocol (PLCP) protocol data unit (PPDU) length and the parameter for UL traffic comprises an UL PPDU length; and
   wherein the instructions executable to adjust the scheduling comprise instructions executable to:
      determine whether the first value satisfies a predetermined DL PPDU length threshold, and whether the second value satisfies a predetermined UL PPDU length threshold; and
      schedule the DL communications duration and the UL communications duration for the transmission opportunity based at least in part on the determinations of threshold satisfaction.

30. The non-transitory computer-readable medium of claim 28, wherein the parameter for DL traffic is at least one of a DL delay, or a DL queue size, or a combination thereof, and the parameter for UL traffic is at least one of an UL delay, or an UL queue size, or a combination thereof; and
   wherein the instructions executable to adjust the scheduling further comprises instructions executable to:
      determine that the second value is greater than the first value; and
      suspend DL communications based at least in part on the determination that the second value is greater than the first value.

* * * * *